US006537358B1

(12) United States Patent
Horiuchi et al.

(10) Patent No.: US 6,537,358 B1
(45) **Date of Patent: *Mar. 25, 2003**

(54) YELLOW RECORDING LIQUID AND PRODUCING METHOD THEREOF AND THE USE THEREOF

(75) Inventors: Takahiro Horiuchi, Nara (JP); Tomoko Inoue, Yamatokoriyama (JP); Masanobu Hasebe, Yokohama (JP)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/522,427

(22) Filed: Mar. 9, 2000

(30) Foreign Application Priority Data

Mar. 11, 1999 (JP) .......................................... 11-065514

(51) Int. Cl.[7] ................................................ C09D 11/02

(52) U.S. Cl. ................ 106/31.6; 106/31.65; 106/31.86; 106/31.8

(58) Field of Search ............................ 106/31.6, 31.65, 106/31.86, 31.8

(56) References Cited

U.S. PATENT DOCUMENTS 4,680,057 A 7/1987 Hays ........................... 106/23
5,746,818 A * 5/1998 Yatake .................... 106/31.86
5,837,045 A * 11/1998 Johnson et al. .......... 106/31.85
5,922,118 A * 7/1999 Johnson et al. ............ 106/31.6
6,004,389 A * 12/1999 Yatake .................... 106/31.86
6,083,315 A * 7/2000 Nakamura et al. .......... 106/410
6,113,680 A * 9/2000 Aoyama et al. ......... 106/31.86
6,153,001 A * 11/2000 Suzuki et al. ............ 106/31.65

FOREIGN PATENT DOCUMENTS

| | | |
|---|---|---|
| EP | 0 535 774 | 7/1993 |
| EP | 0 753 551 | 1/1997 |
| EP | 0 851 005 | 1/1998 |
| JP | 06145545 | 5/1994 |
| JP | 09040898 | 10/1997 |

OTHER PUBLICATIONS

European Search Report.

* cited by examiner

*Primary Examiner*—Mark L. Bell
*Assistant Examiner*—Veronica F. Faison
(74) *Attorney, Agent, or Firm*—David G. Conlin; John B. Alexander; Edwards & Angell, LLP

(57) ABSTRACT

In order to provide an yellow recording liquid having superior spray stability, superior preservation stability, and superior water resistance of a recorded image, etc, yellow pigment particles which have been rendered hydrophilic (accepted a sulfonic acid group) at least on the surface (hydrophilic particles) are dispersed in a liquid. In the product yellow recording liquid, the hydrophilic particles are uniformly dispersed and the particles do not aggregate each other. Thus, the uniformly dispersed state of hydrophilic particles as a recording material can be maintained for a long period, thus realizing an yellow recording liquid having a superior spray stability and superior preservation stability. Further, the hydrophilic particles are also hydrophobic by the intrinsic property of the yellow pigment. Thus, the yellow recording liquid has desirable fixability with respect to a surface of a recording medium (recording surface), regardless of whether the recording surface is hydrophilic or hydrophobic.

26 Claims, 9 Drawing Sheets

YELLOW RECORDING LIQUID AND PRODUCING METHOD THEREOF AND THE USE THEREOF

FIELD OF THE INVENTION

The present invention relates to a recording liquid, particularly an yellow recording liquid, employing a pigment which is suitably used for, for example, an ink jet recording device and writing tools such as a ball point pen and marking pen.

BACKGROUND OF THE INVENTION

Research has been active on various types of ink jet recording methods because they generate less noise and allow fast recording without requiring special fixing on ordinary sheets of paper. A recording liquid to be used in ink jet recording methods needs to possess various properties, which include: a viscosity and surface tension, etc., with the property values in appropriate ranges, the property which does not cause clogging of a fine orifice, the property capable of producing recorded images in clear color tones and with sufficient thickness, and the property which does not undergo any change during preservation or which does not incur deposition or precipitation of a solid component.

In addition to these properties, the recording liquid is further required to have a property which allows recording without limiting the type of recording medium used, as represented by paper, and the property of fast fixing rate with respect to the recording medium, and also superior properties in water resistance, solvent resistance, light resistance, and abrasion resistance, and further the property capable of producing images with superior resolution.

The recording liquid to be used in ink jet recording is generally made up of a pigment as a recording material and a solvent for dissolving the pigment (alternatively, dispersion medium for dispersing the pigment), and the various properties of the recording liquid as exemplified above are heavily influenced by the intrinsic property of the pigment. Thus, it is fairly important to select the pigment appropriately to enable the recording liquid to possess the above properties.

The solubility of the recording material with respect to the solvent (alternatively, dispersibility of the recording material with respect to the dispersion medium) is particularly important, and the solubility (or dispersibility) of the recording material with respect to water and also to a lubricant, which is generally made up of an organic solvent, is least required to maintain a desirable anti-clogging property and dissolution stability (dispersion stability) of the recording material. To this end, for example, (Japanese Unexamined Patent Publication No. 145545/1994 (Tokukaihei 6-145545) (published date May 24, 1994)) discloses an azo dye which is sulfonated (rendered hydrophilic) by dissolving the corresponding azo pigment molecules in an sulfuric acid. The azo dye is dissolved in a liquid such as water to be a water soluble dye and is used as a black ink or reddish brown ink.

However, the recording liquid employing a conventional yellow pigment (yellow recording liquid) as a recording material in reality does not totally satisfy the various properties as listed above due to the fact that the yellow pigment itself is hydrophobic.

Further, a conventional producing method of a recording liquid, in which pigment molecules are dissolved in a solvent after they are treated with an acid and rendered hydrophilic has the problem that the amount of chemicals used in a hydrophilicity rendering process is enormous and it does not permit a continuous process because the method employs a batch system. Further, in some cases, a change in color of the pigment itself is incurred.

SUMMARY OF THE INVENTION

The present invention was made to solve the foregoing problems and accordingly it is an object of the present invention to provide an yellow recording liquid having a superior property in spray stability (properties which have an effect on spraying of a recording liquid, such as spray response, stability in forming a liquid droplet, recording ability for a continuous and extended period of time, and spray stability after a long pause in recording, etc.), preservation stability, and water resistance of a recorded image, etc., and also to provide a producing method of such an yellow recording liquid, as well as a method of using it. Another object of the present invention is to provide a yellow recording liquid having a superior property in fixability (no spreading) on a recording medium, light resistance, and weather resistance, etc., and a producing method of such a yellow recording liquid, as well as a method of using it.

In order to solve the foregoing problems, an yellow recording liquid in accordance with the present invention contains yellow pigment particles which are dispersed in a liquid, and the yellow pigment particles are rendered hydrophilic at least on the surface.

With this arrangement, the yellow pigment particles which are rendered hydrophilic on the surface, for example, by sulfonation ("hydrophilic particles" hereinafter) blend well with the liquid, and the particles are uniformly dispersed without sitting on a liquid surface and do not aggregate each other. Further, the hydrophilic particles are also hydrophobic by the intrinsic property of the yellow pigment and thus exhibit desirable fixability with respect to the surface of a recording medium (recording surface), regardless of whether the recording surface is hydrophilic or hydrophobic. That is, the recording liquid of the present invention can maintain the uniformly dispersed state of hydrophilic particles as a recording material for an extended period of time, thus realizing an yellow recording liquid having a superior spray stability and preservation stability, as well as desirable water resistance of a recorded image.

In order to solve the foregoing problems, according to the method of using the yellow recording liquid in accordance with the present invention, the yellow pigment particles are used as a recording liquid of an ink jet recording device or as a recording liquid of a writing tool.

With this method, a high quality image with superior time stability, water resistance, and light resistance, and having a clear color tone and sufficient thickness can be produced on the recording medium, regardless of whether the surface of the recording medium is hydrophilic or hydrophobic. Further, because the yellow recording liquid has a superior spray stability and superior preservation stability, when used as a recording liquid of an ink jet recording device, clogging of the nozzle of the recording device can be prevented.

In order to solve the foregoing problems, a producing method of an yellow recording liquid in accordance with the present invention includes the steps of: preparing a solution in which an yellow pigment is dissolved in an acidic liquid; turning the solution into particles; bringing the particles into contact with vapor containing water vapor and creating a supersaturated atmosphere of the vapor; depositing yellow pigment particles which are rendered hydrophilic at least on their surface by allowing water to condense on the surface of the particles; and dispersing the yellow pigment particles deposited in a liquid.

With this method, it is not required to have a step of stirring using a stirrer such as a stirring vane for the purpose of rendering the yellow pigment hydrophilic, and the hydrophilic particles (yellow pigment particles which are rendered hydrophilic at least on the surface) do not come to have a charge by friction, etc., and do not aggregate each other. Thus, the deposited hydrophilic particles can easily be dispersed in the liquid without aggregation, thereby realizing a homogeneous yellow recording liquid in which hydrophilic particles having a uniform particle size are uniformly dispersed.

Further, because the device which generates vapor containing water vapor is used, the process can be carried out conveniently over a short period of time using a simple device. Also, because the hydrophilic particles are formed by deposition, the particle size of the product hydrophilic particles is not influenced by the particle size of the hydrophobic substance used (yellow pigment), and it is also possible to make the particle size of the hydrophilic particles relatively small and uniform, thereby conveniently realizing an yellow recording liquid in which hydrophilic particles having a desired particle size are uniformly dispersed.

For a fuller understanding of the nature and advantages of the invention, reference should be made to the ensuing detailed description taken in conjunction with the accompanying drawings.

BRIEF DESCRIPTION OF THE DRAWINGS

FIG. 1(*b*) is a graph showing an IR absorption spectrum after the hydrophilicity rendering process.

DESCRIPTION OF THE EMBODIMENTS

Figure 1A:
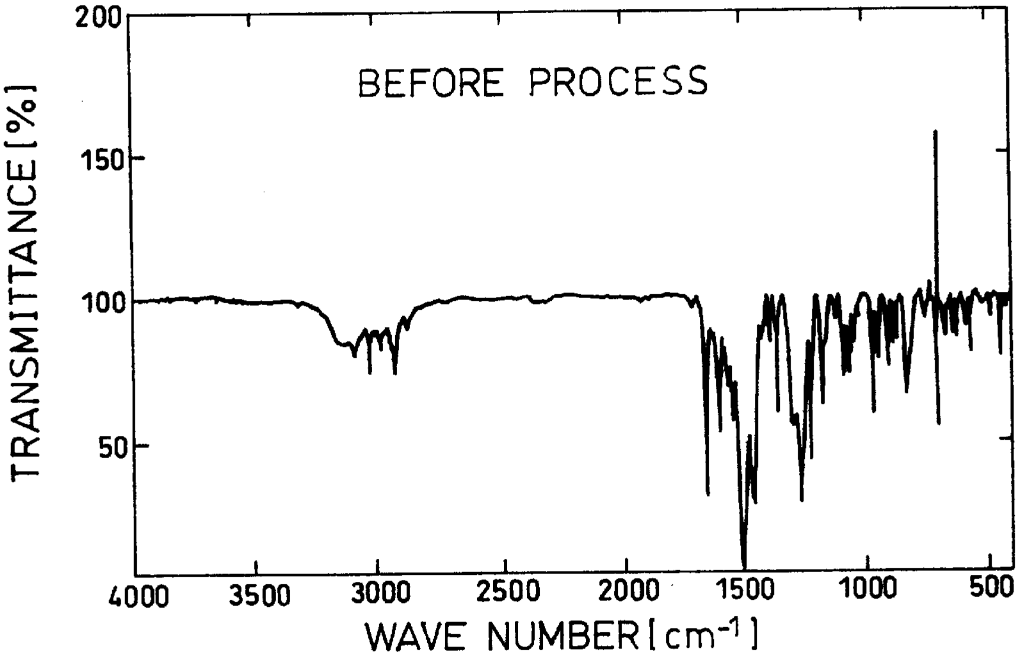
FIG. 1(*a*) is a graph showing an IR absorption spectrum before hydrophilic particles (yellow pigment particles which are rendered hydrophilic at least on the surface) which are to be dispersed in a recording liquid of the present invention are subjected to a hydrophilicity rendering process (in the form of an yellow pigment)

An yellow recording liquid ("recording liquid" hereinafter) of the present invention is a dispersion of "yellow pigment" particles in a "liquid", wherein the yellow pigment particles are rendered hydrophilic at least on the surface. The recording liquid may further include an anti-spreading agent (described later), water soluble dye, solubilizing agent, and other agents as required.

As the yellow pigment of the present invention, various yellow pigments, for example, such as a pigment having an azo structure, such as azo pigment (mono-azo pigment, bis-azo pigment, and poly-azo pigment) and condensed azo pigment; isoindolinone pigment; and quinophthalone pigment are available. However, as long as the pigment particles are rendered hydrophilic at least on the surface, for example, by sulfonation reaction, the pigment is not particularly limited to these.

Specifically, as the azo pigment, for example, C.I. (Color Index) Pigment Yellow 1, 2, 3, 5, 6, 10, 12, 13, 14, 15, 16, 65, 81, and 83, and the SANYO COLOR WORKS, LTD. product Fast Yellow F5G are available. As the condensed azo pigment, specifically, C.I. Pigment Yellow 93 and 95 are available, for example. As the isoindolinone pigment, specifically, C.I. Pigment Yellow 109 and 110 are available, for example. As the quinophthalone pigment, specifically, C.I. Pigment Yellow 138 is available, for example.

Of those yellow pigments as exemplified above, considering the property which is resistant to color change as induced by the hydrophilicity rendering process (described later), and considering superior light resistance and weather resistance (i.e., having a chemically stable structure), pigments having an azo structure are preferable, and pigments having a mono-azo structure, bis-azo structure, and condensed azo structure are more preferable, and pigments having a mono-azo structure are even more preferable. Specifically, as the pigments having a mono-azo structure, for example, C.I. Pigment Yellow 1, 2, 3, 5, 6, and 65, and Fast Yellow F5G are available. Further, of the yellow pigments having a mono-azo structure, the ones with a structure in which a coupler component of the pigment does not have a condensed ring are chemically very stable and therefore are particularly preferable. These pigments may be used individually or in combination of two or more kinds. Note that, the specific method as to how these yellow pigments are rendered hydrophilic at least on the surface will be described later.

The type and content of the yellow pigment particles which is rendered hydrophilic at least on the surface (referred to as "hydrophilic particles" hereinafter where appropriate) in the recording liquid are not particularly limited, and they are set appropriately depending on the use of the recording liquid, the type of the yellow pigment, and the type of a liquid to be described later. Generally, the content of hydrophilic particles is in a range of not less than 0.01% by weight (mass) to not more than 20% by weight, and preferably in a range of not less than 0.1% by weight to not more than 10% by weight.

The particle size of the hydrophilic particles is not particularly limited either, and it is set appropriately depending on the use of the recording liquid and the composition of the liquid to be described later, etc. Generally, the particle size of hydrophilic particles in a range of not less than 10 nm to not more than 5 μm offers a desirable dispersion of the hydrophilic particles in the recording liquid and is preferable.

Further, by using a mixture of hydrophilic particles of two or more kinds particle sizes, the aggregation rate of the hydrophilic particles can be controlled in the recording liquid which was sprayed onto a recording medium such as paper, thus reducing spreading of the recording liquid. In the mixture, even though the relationship between different particle sizes is not particularly limited, when using a mixture of hydrophilic particles of two kinds of particle size, spreading of the recording liquid can be effectively prevented by setting the ratio of particle sizes of the smaller hydrophilic particles to larger hydrophilic particles in a range of more than 1:1 to not more than 1:10. Note that, the proportions of the smaller hydrophilic particles and larger hydrophilic particles in the mixture is not particularly limited.

Note that, the "particles" in the present invention are fine particles which are solid under ordinary temperature and ordinary pressure (which are 25° C. and atmospheric pressure hereinafter), and are those having a stable particle structure which does not undergo a change in basic structure such as dissolution, decomposition, and polymerization in the recording liquid of the present invention.

Further, specifically, the state in which "yellow pigment particles are rendered hydrophilic at least on the surface" refers to the state in which the yellow pigment particles which are in contact with the "liquid" to be described later are rendered hydrophilic at least partially on the surface of the particles contacting the liquid, and it does not necessarily mean that the yellow pigment particles are rendered hydrophilic in its entirety. Note that, by "rendered hydrophilic", it is meant that the hydrophilicity has improved as compared with that before the process, and it can be realized for example by introducing a hydrophilic group such as a sulfonic group on the surface of the yellow pigment particles.

The "liquid" in the present invention is in a liquid phase under ordinary temperature and ordinary pressure, and the composition thereof is not particularly limited as long as it can uniformly disperse the hydrophilic particles. Nevertheless, specifically, the liquid is composed of a water soluble (hydrophilic) liquid of one or more kinds so that it can blend with the hydrophilic particles which are rendered hydrophilic at least on the surface, uniformly dispersing the hydrophilic particles. Note that, such a water soluble liquid includes water.

The liquid preferably contains water as a main component. This is because the use of water as the liquid offers a safe and inexpensive recording liquid. Note that, by "containing water as a main component", it is meant that the proportion (weight base) of water is the largest among various substances contained in the recording liquid.

In some cases, the liquid preferably includes various water soluble organic compounds, which are also referred to as organic solvents, as a component of the liquid. Specifically, as such water soluble organic compounds, for example, the following compounds are available: alkyl alcohols having a carbon number of 1 to 4, such as methyl alcohol, ethyl alcohol, n-propyl alcohol, isopropyl alcohol, n-butyl alcohol, sec-butyl alcohol, tert-butyl alcohol, and isobutyl alcohol; amides such as dimethyl formamide and dimethyl acetoamide; ketones or ketoalcohols, such as acetone and diacetone alcohol; ethers such as tetrahydrofuran and dioxane; polyalkyl glycols such as polyethylene glycol and polypropylene glycol; alkylene glycols in which the alkylene group includes 2 to 6 carbon atoms, such as ethylene glycol, propylene glycol, butylene glycol, triethylene glycol, 1,2,6-hexanetriol, thiodiglycol, and hexylene glycol; multivalent alcohols such as glycerine and diethylene glycol; low grade alkyl ethers such as methyl ether, diethylene glycol methyl(ethyl)ether, and triethylene glycol monomethyl(ethyl)ether; and nitrogen containing heterocyclic ketones such as 2-pyrrolidone, pyrrole, and pyridine. These water soluble organic compounds may be used individually or in combination of two or more kinds as required.

Of those water soluble organic compounds as exemplified above, multivalent alcohols including polyalkyl glycols and alkylene glycols; low grade alkyl ethers; and nitrogen containing heterocyclic ketones such as 2-pyrrolidone, pyrrole, and pyridine are more preferable, and alkylene glycols in which the alkylene group contains 2 to 6 carbon atoms are particularly preferable. Further, the water soluble organic compounds other than amides and ketones act as a lubricant for preventing evaporation of the liquid (mainly water) in the recording liquid, and have the effect of preventing clogging of a nozzle of the ink jet recording device by preventing association and deposition of the hydrophilic particles as a recording material. In particular, multivalent alcohols exhibit a large effect as a lubricant and are particularly preferable. Also, as will be described later, nitrogen containing heterocyclic ketones also act as a solubilizing agent.

Generally, the content of the liquid is in the range of not less than 60% by weight and not more than 99.9% by weight with respect to the recording liquid, and the range of not less than 70% by weight to not more than 99.9% by weight is preferable. The type and content of the water soluble organic compound in the recording liquid is not particularly limited, and they are set appropriately depending on the use of the recording liquid and the type of the yellow pigment, etc.

Further, for the purpose of preventing spreading of the recording liquid in recording, the recording liquid may include an anti-spreading agent such as ammonium polyacrylate or a co-polymer of vinyl alcohol and acrylic acid. As such an anti-spreading agent, conventionally known compounds may be used in addition to the compounds as exemplified above, and they can be used individually or in combination of two or more kinds as required. Note that, ammonium polyacrylate and the co-polymer of vinyl alcohol and acrylic acid also act as a dispersing agent of particles or as a surfactant.

The type and content of the anti-spreading agent in the recording liquid are not particularly limited, and they are set appropriately depending on the use of the recording liquid, the type of the recording medium, and the type of the yellow pigment and liquid, etc. Further, when using the co-polymer as the anti-spreading agent, the content ratio of monomers making up the co-polymer is not particularly limited either.

For example, when using ammonium polyacrylate alone as the anti-spreading agent, generally, the content (amount added) in a range of not less than 0.5% by weight to not more than 10% by weight with respect to the recording liquid is preferable, and the range of not less than 1% by weight to not more than 10% by weight is more preferable. This is because when the content of ammonium polyacrylate is less than 0.5% by weight, the anti-spreading effect cannot be expected, and when the content of ammonium polyacrylate exceeds 10% by weight, a further anti-spreading effect proportional to the amount of ammonium polyacrylate added cannot be observed, and some of the additional ammonium polyacrylate are wasted, which is not only economically viable but increases the viscosity of the recording liquid and causes clogging of the nozzle and reduction in the function of the recording liquid.

Further, when using a co-polymer of vinyl alcohol and acrylic acid alone as the anti-spreading agent, generally, the content (amount added) in the range of not less than 1.0% by weight and not more than 10% by weight is preferable, and the range of not less than 3% by weight and not more than 10% by weight is further preferable. This is because when the content of the co-polymer is less than 1.0% by weight, the anti-spreading effect cannot be expected, and when the content of co-polymer exceeds 10% by weight, a further anti-spreading effect proportional to the amount of co-polymer added cannot be observed, and some of the additional co-polymer are wasted, which is not only economically viable but increases the viscosity of the recording liquid and causes clogging of the nozzle and reduction in the function of the recording liquid.

As described, by preparing the recording liquid by adding the anti-spreading agent, the permeability of the recording liquid through the recording medium can be reduced, thus preventing spreading of the recording liquid. In general, when the permeability of the recording liquid through the recording medium is reduced, the dryness of the recording liquid decreases. However, the ammonium polyacrylate and co-polymer of vinyl alcohol and acrylic acid are capable of preventing spreading of the recording liquid while maintaining (without reducing) the dryness of the recording liquid, which makes these compounds particularly preferable, thus realizing a recording liquid having desirable dryness and capable of performing recording with less spreading even when ordinary paper is used as the recording medium.

The recording liquid of the present invention may include a water soluble dye as required. Such a water soluble dye is not particularly limited as long as it is soluble in the liquid and can be colored. The water soluble dye may be used individually or in combination of two or more kinds. The type and content of the water soluble dye in the recording liquid is not particularly limited either, and they are set appropriately depending on the use of the recording liquid, the type of the recording medium, and the type of the yellow pigment and liquid, etc. Specifically, the recording liquid may include, for example, an yellow dye, blue dye, or red dye as the water soluble dye, but the water soluble dye is not limited to these.

Specifically, as the yellow dye, for example, the following dyes, but not limited to these, are available: C.I. Acid Yellow 7, 12, 17, 23, 27, 29, 33, 42, 44, 50, 79, 86, 99, 110, 142, 157; C.I. Food Yellow 3, 4; C.I. Direct Yellow 1, 12, 24, 26, 27, 33, 44, 50, 86, 110, 120, 132, 142, 144; C.I. Basic Yellow 1, 2, 11, 13, 14, 15, 19, 21, 23, 24, 25, 28, 29, 32, 36, 40, 41, 45, 49, 51, 53, 63, 67, 70, 73, 77, 87, 91; C.I. Reactive Yellow 1, 5, 11, 13, 14, 20, 21, 22, 25, 40, 47, 51, 55, 65, 67.

As the blue dye, for example, C.I. Direct Blue 1, 2, 6, 8, 15, 22, 25, 71, 86, 98, 108, 192, 199, 201, 237 are available but not limited to these. As the red dye, for example, C.I. Direct Red 1, 11, 37, 52, 75, 81, 99, 220, 227; C.I. Acid Red 87, 92, 94, 115, 154, 131, 186, 254 are available but not limited to these.

By additionally containing the water soluble dye, the transparency, glossiness, and color tone of the recording liquid can be improved, and it is possible to delicately change the tone of the color, thus broadening the field to which the recording liquid can be applied. Further, the stability in preservation of the recording liquid can be improved.

The recording liquid of the present invention may further include various additives such as below. For example, as additives, anti-fouling agent, anti-fungal agent, pH adjusting agent, anti-corrosive agent, surface tension adjusting agent, viscosity adjusting agent, UV light absorbing agent, and IR light absorbing agent are available but not limited to these. Further, a solubilizing agent may also be added.

The method of producing the yellow recording liquid of the present invention is not particularly limited, and one example of the method includes the steps of (1) preparing a solution in which an yellow pigment is dissolved in an acidic liquid; (2) turning the solution into particles; (3) bringing the particles into contact with vapor containing water vapor and creating a supersaturated atmosphere of the vapor; (4) depositing yellow pigment particles which are rendered hydrophilic at least on their surface by allowing water to condense on a surface of the particles; and (5) dispersing the yellow pigment particles deposited in a liquid.

According to this method, the yellow pigment is rendered hydrophilic by being dissolved in an acidic liquid, making the yellow pigment hydrophilic. Then, the vapor containing water vapor is mixed with the solution (i.e., acidic liquid in which yellow pigment is dissolved) as the supersaturated atmosphere is created and as the vapor is brought into contact with the particles, thus diluting the solution. As a result, by the dilution of the solution, the hydrophilic substance (i.e., yellow pigment made hydrophilic) dissolved in the solution deposits and becomes the yellow pigment particles which are rendered hydrophilic at least on the surface. The deposited yellow pigment particles are then dispersed in the liquid, thus preparing the yellow recording liquid.

Namely, because it is not required to provide a step of stirring using a stirrer such as a stirring vane for the purpose of rendering the yellow pigment hydrophilic, the hydrophilic particles (yellow pigment particles which are rendered hydrophilic at least on the surface) do not come to have a charge by friction, etc., to aggregate each other. Thus, the deposited hydrophilic particles can easily be dispersed in the liquid without aggregation, thereby realizing a homogeneous yellow recording liquid in which hydrophilic particles having a uniform particle size are uniformly dispersed.

Note that, by "exposing the particles to a supersaturated atmosphere of vapor containing water vapor", specifically, it is meant, for example, that (1) the particles are brought into contact with vapor containing water vapor having higher temperature than that of the particles to create a supersaturated atmosphere of the vapor, (2) the particles are cooled after mixed with vapor containing water vapor to create a supersaturated atmosphere of the vapor, and (3) the particles are adiabatically expanded after mixed with vapor containing water vapor to create a supersaturated atmosphere of the vapor.

Further, because the device which can generate vapor containing water vapor is used, the process can be carried out conveniently over a short period of time using a simple device. Also, because the hydrophilic particles are formed by deposition, the particle size of the product hydrophilic particles is not influenced by the particle size of the hydrophobic substance used (yellow pigment), and it is also possible to make the particle size of the hydrophilic particles relatively small and uniform. These aspects will be described in more detail in the following description of a manufacturing apparatus of the hydrophilic particles.

The following will describe a manufacturing apparatus of the yellow pigment particles which are rendered hydrophilic at least on the surface ("hydrophilic particles" hereinafter unless noted otherwise) and which is to be dispersed in the recording liquid of the present invention, and also an overall operation of the manufacturing apparatus will be described referring to FIG. 2 through FIG. 9(*b*).

[Manufacturing Apparatus 1]

Figure 2:
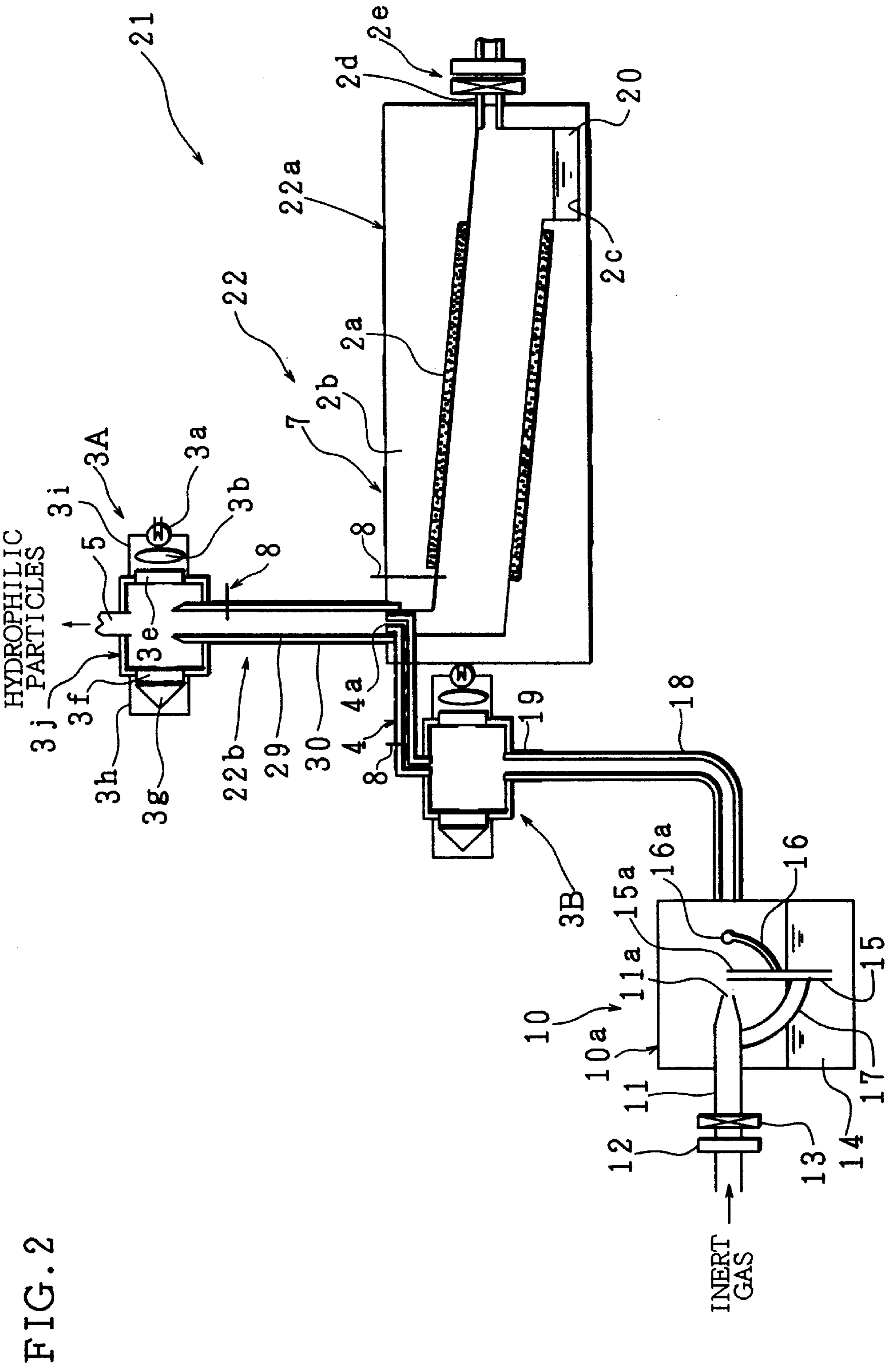
FIG. 2 is a schematic drawing showing one example of a manufacturing apparatus for producing the hydrophilic particles to be dispersed in the recording liquid of the present invention.

The following describes with reference to FIG. 2 one example of a manufacturing apparatus which is suitably used for producing the hydrophilic particles to be included in the recording liquid of the present invention.

As shown in FIG. 2, a manufacturing apparatus 21 includes an atomizer 10, a modifying chamber 22 composed of a vapor generator 22*a* and a tubular mixing section 22*b*, and an optical measuring devices 3A and 3B, etc., for continuously producing the hydrophilic particles.

The optical measuring device 3A has an arrangement in which a light source 3*a*, lens 3*b*, light-shielding plate (not shown), transmissive plates 3*e* and 3*f* which are made of glass and provided as a partition of the mixing section 22*b*, and a photodetector 3*g*, etc., are provided in casings 3*j*, 3*h*, and 3*i*. In the optical measuring device 3A, the light emitted from the light source 3*a* is incident on the photodetector 3*g* via lens 3*b*, opening section of the light-shielding plate, transmissive plate 3*e*, through mixing section 22*b*, and transmissive plate 3*f*.

The light emitted from the light source 3*a* is scattered by the hydrophilic particles in the mixing section 22*b* and becomes weak, resulting in a change in quantity of light. The optical measuring device 3A, based on this change, measures the number of liquid particles contained in a unit volume (density of liquid particles) based on a signal outputted from the photodetector 3*g* in accordance with the quantity of incident light. By measuring the particle size of the hydrophilic particles using the optical measuring device 3A, the particle size can be controlled.

The optical measuring device 3B has a similar arrangement to that of the optical measuring device 3A, and measures the particle size of the liquid particles supplied from the atomizer 10, and also measures the number of liquid particles contained in a unit volume (density of liquid particles).

Note that, even though the optical measuring devices 3A and 3B carry out the measurement of particle size using a photodialysis/scattering method, the measuring method is not particularly limited, and it is possible for example to adopt X-ray transmission method, precipitation method, laser diffraction/scattering method, and photon correlation method utilizing dynamic scattering. Further, instead of the method for optically carrying out the measurement, an image processing analysis, etc., employing a light microscope or electron microscope may be adopted. By the provision of the optical measuring devices 3A and 3B and by controlling the manufacturing process of the hydrophilic particles based on the results of measurement by the optical measuring devices 3A and 3B, it is possible to stably produce hydrophilic particles having a small and uniform particle size.

The vapor generating section 22*a* is in the form of a long cylinder or prism which extends in a horizontal direction, and is composed of an inner wall section 2*a* and outer wall section 2*b*, and inside the vapor generating section 22*a* constitutes a vapor generating space. The inner wall section 2*a* at least partially is made of a porus material such as ceramics and nonwoven fabric, which has affinity for an aqueous solution, such as water or an azeotropic composition containing water (simply "water" hereinafter), and which holds the aqueous solution.

To the inner wall section 2*a* is adhered water in advance, or the inner wall section 2*a* is impregnated with water in advance, by which the inner wall section 2*a* generates vapor, or more preferably saturated vapor, as the temperature and pressure in the vapor generating section 22*a* are controlled by control means such as a micro computer (not shown). The outer wall section 2*b* is made of stainless, etc.

The vapor generating section 22*a* is provided on its outer periphery with a heating device 7, for example, in the spiral manner. On the upper side of the vapor generating section 22*a* is provided a thermometer 8 for measuring the temperature of the vapor generating space. The shape of the vapor generating section 22*a* is not particularly limited, but a horizontal rectangular shape is more preferable than a vertical rectangular shape to efficiently manufacture the hydrophilic particles using the present manufacturing apparatus.

The vapor generating space extending in the lengthwise direction of the vapor generating section 22*a* is provided such that it takes the shape of, for example, a hollow cylinder which is vertically inclined with respect to the axial direction of the vapor generating section 22*a*. At the lower side edge in the vapor generating section 22*a* is provided a reservoir 2*c* for storing water 20.

Because the vapor generating section 22*a* is inclined, in addition to generating vapor, water 20 adhering on or impregnating into the inner wall section 2*a* in advance partially flows into the reservoir 2*c*. To the lower side end of the vapor generating section 22*a* is connected a purified gas supply tube 2*d* for supplying a purified gas such as inert gas into the modifying chamber 22. The purified gas supply tube 2*d* is connected to a purified gas supply device (not shown) via valve 2*e*. Note that, instead of making water adhered to the inner wall section 2*a* in advance or making the inner wall section 2*a* impregnated with water in advance, water may stored beforehand in the reservoir 2*c*.

On an upper portion of the vapor generating section 22*a* is provided the mixing section 22*b* in the form of a long cylinder extending in upper and lower directions so that it is in communication with an upper side edge of the vapor generating space inside the vapor generating section 22*a*. The mixing section 22*b* is composed of a mixing tube 29 made of stainless, etc., and a cooling device 30 provided around the mixing tube 29, and inside the mixing section 22*b* constitutes a processing space. Thus, the processing space is in communication with the vapor generating space. On an upper side of the mixing section 22*b* is provided a thermometer 8 for measuring the temperature of the processing space.

In the vicinity of where the vapor generating section 22*a* and the mixing section 22*b* are connected, a particle supply tube 4 is connected to the mixing tube 29 with particle inlet 4*a* directing upward as the opening section. The upper end of the mixing tube 29 is connected to a particle retrieving device (not shown) via the optical measuring device 3A for optically measuring the particle size of the hydrophilic particles in the modifying chamber 22 and via particle outlet 5. Thus, the manufacturing apparatus 21 is composed mainly of the atomizer 10, modifying chamber 22, optical measuring devices 3A and 3B, and particle retrieving device and control means, etc., (both not shown).

The particle supply tube 4 is in communication with a particle supply tube 18 via the optical measuring device 3B for optically measuring the particle size of the liquid particles to be supplied into the modifying chamber 22. The particle supply tube 18 is connected to the atomizer 10. The particle supply tube 4 is provided with a thermometer 8 for measuring the temperature therein. Also, the particle supply tube 4 continuously supplies the liquid particles to the mixing tube 29 together with an inert gas.

The atomizer 10 includes an atomizer 10*a,* nozzle 11, solution supply tube 15, baffle (particle size adjuster) 16, and particle supply tube 18, etc., and it can continuously supply liquid particles into the mixing tube 29. They are provided such that a tip 11*a* of the nozzle 11, an upper end 15*a* of the solution supply tube 15, a tip 16*a* of the baffle 16, and an opening section of the particle supply tube 18 are aligned on a horizontal straight line.

In the atomizer 10*a* is prepared a predetermined amount of solution 14 which includes an yellow pigment as a hydrophobic substance dissolved in an acidic liquid. Note that, even though the particle size of the yellow pigment is generally in a range of 10 nm to 5 $\mu$m, it is not particularly limited.

The solution supply tube 15 is fixed onto the nozzle 11 by a supporting member 17. The lower portion of the solution supply tube 15 is soaked in solution 14, and as the pressure in the solution supply tube 15 is reduced by the inert gas sprayed horizontally toward the upper end 15*a,* the solution 14 is drawn to the upper end 15*a* by suction.

The nozzle 11 is connected to a portion of the atomizer 10*a,* opposite to the particle supply tube 18, and supplies an inert gas (carrier) into the atomizer 10*a.* The nozzle 11 is connected to an inert gas supply device (not shown) via an air filter (impurity removing device) 13 and mist removing section (impurity removing device) 12. The nozzle 11 atomizes the solution 14 by horizontally spraying the inert gas toward the upper end 15*a* of the solution supply tube 15 from its tip 11*a* so as to turn the solution 14 into particles (mist). The mist removing section 12 and the air filter 13 remove impurity contained in the inert gas so that a pure inert gas is supplied into the atomizer 10*a.*

The baffle 16 is fixed on the solution supply tube 15, and has a spherical upper end 16*a.* The liquid particles which were created at the upper end 15*a* of the solution supply tube 15 collide with the tip 16*a* together with the inert gas, by which liquid particles having a relatively large particle size are removed by the baffle 16. Namely, by adjusting the particle size of the liquid particles by the baffle 16, the atomizer 10*a* supplies liquid particles of a relatively small and uniform size into the mixing tube 29.

The maximum particle size of the liquid particles which should be supplied into the mixing tube 29 can be controlled arbitrarily by appropriately adjusting the size of the tip 16*a* of the baffle 16. Also, the supply amount per unit time of the liquid particles can be controlled arbitrarily by adjusting various atomization conditions such as the tube diameter of the solution supply tube 15, and the flow amount and flow rate of the inert gas. Note that, the liquid particles which were removed by baffle 16 flows down along the baffle 16 to be recycled as solution 14.

The particle supply tube 18 is connected to a portion of the atomizer 10*a,* opposite to the nozzle 11. The particle supply tube 18, via the optical measuring device 3B, is in communication with the particle supply tube 4 which is connected to the mixing section 22*b.* The particle supply tube 18 at the end portion of the optical measuring device 3B is provided with a cooling device 19 which cools the liquid particles as required.

The cooling device 19 is provided with a Peltier element, and by the Peltier effect, inside the particle supply tube 18, i.e., the liquid particles in the particle supply tube 18 are cooled. The cooling device 19 is arranged in accordance with a desired cooling temperature and the arrangement thereof is not particularly limited. For example, the cooling device 19 may be arranged in such a manner that the liquid particles are cooled by the use of an organic solvent (coolant), which were cooled, for example, by liquid nitrogen, water, or dry ice. Alternatively, the cooling device 19 may be, for example, a Liebig condenser, through which a coolant such as water or iced water is flown.

To produce the hydrophilic particles using the manufacturing apparatus 21 having the described arrangement, first, after securing the vapor generating space in the modifying chamber 22, vapor or preferably saturated vapor is generated by the use of the heating device 7 from water (alternatively, water 20 stored in reservoir 20*c*) which has been adhered to or impregnated into the inner wall section 2*a.* By the purified gas (carrier) supplied from the purified gas supply tube 2*d,* the vapor generated in the vapor generating section 22*a* is drawn into the mixing section 29 as the processing space which is in communication with the vapor generating space.

Then, liquid particles are generated by the atomizer 10 and the liquid particles are continuously supplied into the mixing tube 29. Namely, the solution 14 is turned into particles by horizontally spraying the inert gas toward the upper end 15*a* of the solution supply tube 15 from the tip 11*a* of the nozzle 11, and the particle size of the liquid particles is adjusted by the baffle 16. The liquid particles thus obtained are supplied (drawn) into the mixing tube 29 of the mixing section 22*b* via particle supply tube 18, optical measuring device 3B, and particle supply tube 4. Here, the liquid particles passing though the particle supply tube 18 are cooled as required by the cooling device 19.

The liquid particles supplied into the mixing tube 29 is mixed with the vapor generated from the vapor generating section 22*a.* Further, the mixing tube 29 is cooled using cooling device 30 to bring the vapor in a cooled state and to create a supersaturated atmosphere, thus condensing water on the surface of the liquid particles. By the condensed water, the acidic liquid making up the liquid particles is diluted, and the yellow pigment which was rendered hydrophilic and is contained in the liquid particles deposits to be the hydrophilic particles. Then, by measuring the particle size of the hydrophilic particles using the optical measuring device 3A, the manufacturing apparatus 21 is controlled to obtain hydrophilic particles of a desired particle size, and the hydrophilic particles are drawn out of the mixing tube 29 via the particle outlet 5.

The particle size of the hydrophilic particles can be controlled easily by appropriately setting the heated temperature of the vapor generating section 22*a,* the flow rate of the inert gas and purified gas (carrier), the temperature of the liquid particles, and the temperature of the mixing section 22*b,* etc. Further, the time by which the liquid particles are exposed to vapor (saturated vapor) in the mixing section 22*b* can be easily adjusted by appropriately setting the flow rate of the inert gas and purified gas, and the length of the mixing tube 29, etc.

As a result, hydrophilic particles having a desired particle size can be produced conveniently as well as continuously.

The manufacturing apparatus 21 continuously produces the hydrophilic particles, and thus compared with the manufacturing apparatus of a batch system, it is better suited for a continuous process under the same condition. Therefore, hydrophilic particles having a uniform property can be stably produced in mass production. When using the manufacturing apparatus 21 to produce the hydrophilic particles, it is preferable that inside the apparatus is replaced beforehand with a purified gas, for example, such as the inert gas used as a carrier.

The hydrophilic particles drawn out of the particle outlet 5 are retrieved (collected) by the particle retrieving device (not shown). The hydrophilic particles thus retrieved are water washed using extra-pure water, etc., by a cleaning device (not shown), thus obtaining hydrophilic particles from which impurity has been removed. The hydrophilic particles thus washed are dried as required to the degree which does not allow particles to aggregate.

When manufacturing the hydrophilic particles using the manufacturing apparatus 21 having the described arrangement, instead of cooling the mixing tube 29 by the cooling device 30 after supplying the liquid particles into the mixing tube 29, the liquid particles may be drawn into the mixing tube 29 after cooling it by the cooling device 19 (cooled to a temperature lower than that of vapor), by which the supersaturated atmosphere of the vapor is created in the mixing tube 29 by the temperature difference between the vapor and liquid particles, thus condensing water on the surface of the liquid particles.

As described, the manufacturing apparatus 21 includes (a) atomizer 10 for creating particles of solution 14 which contains an yellow pigment being dissolved in an acidic liquid so as to render the yellow pigment as a hydrophobic substance hydrophilic, and (b) mixing section 22*b* for creating a supersaturated atmosphere of the vapor by bringing the liquid particles created by the atomizer 10 into contact with the vapor having a higher temperature than the temperature of the liquid particles so as to condense water on the surface of the liquid particles.

With this arrangement, it is possible to produce hydrophilic particles having a relatively small and uniform particle size without charging the particles, and the hydrophilic particles can be produced inexpensively with a simple apparatus and simple operations over a short period of time.

Further, because the manufacturing apparatus 21 adopts the atomizer 10 as a granulation device, hydrophilic particles having an even smaller particle size can be produced. Also, the manufacturing apparatus 21 includes cooling device 19 for cooling liquid particles, which allows water to condense on the surface of the liquid particles even more easily, thus producing the hydrophilic particles in a shorter period of time. Further, because the atomizer 10 is provided with baffle 16, hydrophilic particles having an even smaller and more uniform particle size can be produced.

Note that, the above description is based on the manufacturing apparatus 21 which can produce hydrophilic particles continuously. However, the specific arrangement of the manufacturing apparatus is not just limited to the described example, and it is possible for example to have an arrangement in which the hydrophilic particles can be produced by the manufacturing apparatus of a batch system. Each manufacturing step of the manufacturing apparatus is controlled by control means, etc., such as a program-installed micro computer (not shown).

Also, the above description is based on the manufacturing apparatus 21 in which the vapor is cooled to create a supersaturated atmosphere. However, the manufacturing apparatus may have an arrangement in which the vapor is adiabatically expanded to create a supersaturated atmosphere (supersaturated vapor). Further, even though the above description is based on the atomizer 10 as the granulation device, the arrangement of granulation device is not particularly limited. For example, the granulation device may be arranged such that the solution is turned into particles by scattering the solution by vibration of an ultrasonic wave.

[Manufacturing Apparatus 2]

Figure 3:
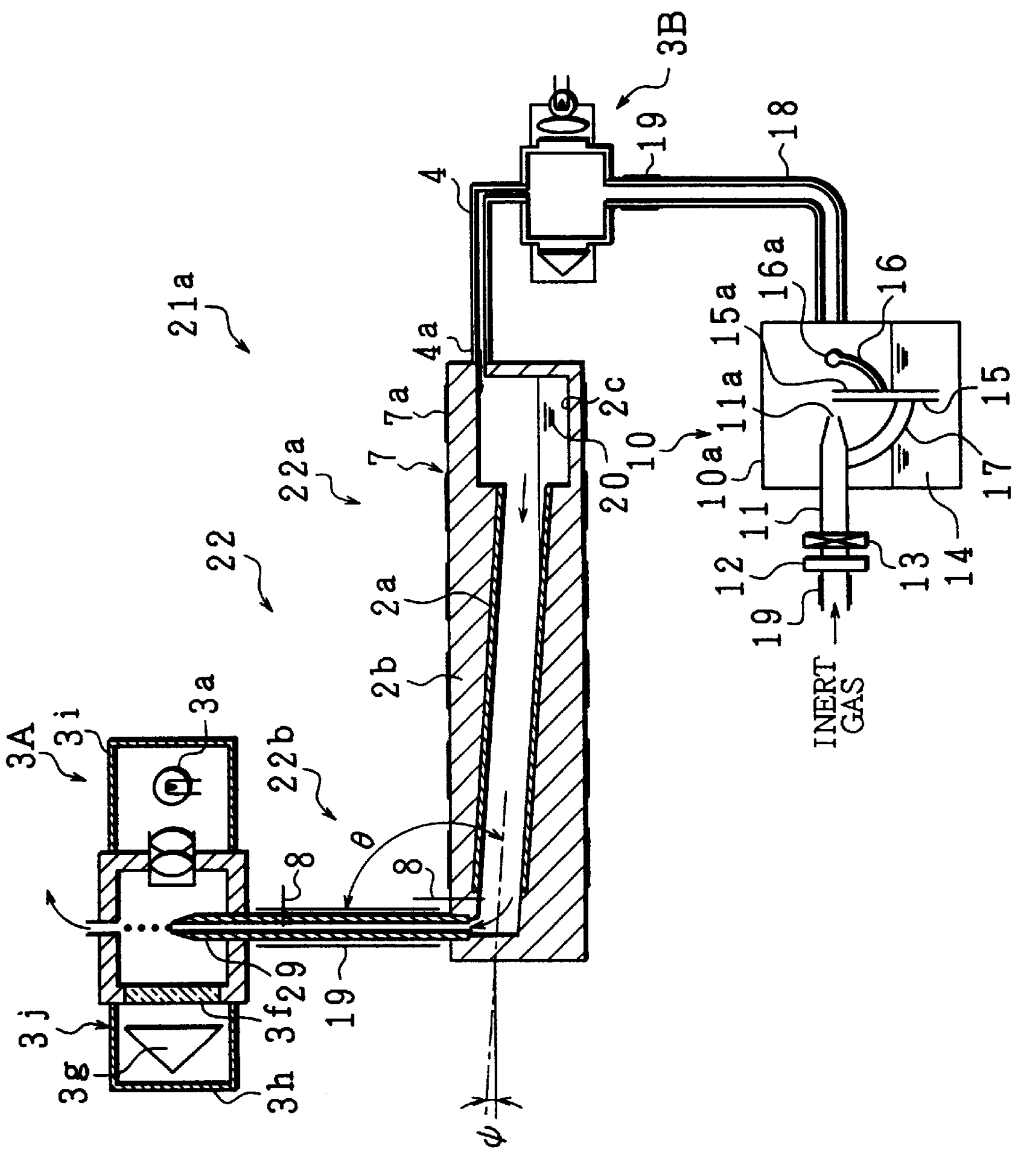
FIG. 3 is a schematic drawing showing another example of the manufacturing apparatus for producing the hydrophilic particles to be dispersed in the recording liquid of the present invention.

A manufacturing apparatus 21*a* as shown in FIG. 3 is a modification example of the manufacturing apparatus 21 as described above. Note that, the members having the same functions as those described in the manufacturing apparatus 21 are given the same reference numerals in FIG. 3 and explanations thereof are omitted here.

In the manufacturing apparatus 21*a,* a particle inlet 4*a* of particle supply tube 4 for supplying liquid particles together with the inert gas is provided such that it opens above the end portion of the reservoir 2*c* in the vapor generating space of the vapor generating section 22*a.*

The central axis of vapor generating space having a hollow cylindrical shape (straight tube) in the vapor generating section 22*a* is vertically inclined with respect to the horizontal direction as noted above, and the tilt angle $\phi$ is set at 90° or less with respect to the horizontal line.

Thus, in the vapor generating section 22*a* of the manufacturing apparatus 21*a,* the liquid particles and inert gas can be continuously supplied into the vapor generating section 22*a* through the particle supply tube 4 via particle inlet 4*a.*

Further, in the manufacturing apparatus 21*a,* the mixing tube 29 as a condenser is attached to the vapor generating section 22*a* so that the angle $\theta$ between the central axis of the mixing tube 29 and the central axis of the tubular vapor generating space in the vapor generating section 22*a* is in a range of 90°, as the vertical direction, to 1°.

Around the mixing tube 29 is provided the cooling device 19 for cooling inside the mixing tube 29. The inner wall section of the mixing tube 29 is at least partially made of a water repelling material such as fluoro resin having a water repelling property for water and for an aqueous solution containing water. Also, the mixing tube 29 is in communication with the vapor generating section 22*a* and extends upward from the upper portion thereof.

Thus, even when the vapor in the mixing tube 29 condenses on the inner wall section of the mixing tube 29 and becomes water, the water flows back to the vapor generating section 22*a* along the inner wall section, thus efficiently using water as a condensing agent.

The heating device 7 provided around the vapor generating section 22*a,* and the cooling device 19 of the mixing tube 29 are each provided with adjusting means (not shown) such as a programmed microcomputer which controls the temperature at a predetermined value based on the measurement results of thermometers 8 respectively provided for the vapor generating section 22*a* and the mixing section 22*b.*

The manufacturing apparatus 21*a* is capable of producing the same hydrophilic particles as that produced by the manufacturing apparatus 21 by the same operations except for the following operations, which are not performed by the manufacturing apparatus 21.

The following will describe such operations. First, the liquid particles adjusted in the atomizer 10 are supplied into the vapor generating section 22*a* from the upper side (right side) of the end portion of the reservoir 2*c* in the inner processing space of the vapor generating section 22*a* through the particle supply tube 4, thus simplifying the arrangement.

Therefore, in the manufacturing apparatus 21*a,* as with the manufacturing apparatus 21, water can be condensed on the surface of the liquid particles, and the condensation of water on the surface of the liquid particles can be made uniform, thus stably producing the hydrophilic particles.

When producing the hydrophilic particles using the manufacturing apparatus 21*a* having the described arrangement, instead of cooling the vapor in the mixing tube 29 after supplying the liquid particles into the vapor generating section 22*a,* the liquid particles may be introduced into the vapor generating section 22*a* after cooling it using the cooling device 19 (cooled to a temperature lower than that of saturated vapor in the vapor generating section 22*a*) provided around the particle supply tube 18, by which the supersaturated atmosphere of the vapor is created by the temperature difference between the vapor and the liquid particles, so as to condense the vapor-derived water on the surface of the liquid particles.

Further alternatively, the liquid particles may be introduced into the vapor generating section 22*a* after it was cooled (cooled to a temperature lower than the temperature of saturated vapor in the vapor generating section 22*a*), by providing the cooling device 19 on the preceding stage of the atomizer 10 and by pre-cooling the inert gas (carrier) to be supplied into the atomizer 10. Further, the liquid particles and inert gas (carrier) to be supplied to the vapor generating section 22*a* may also be cooled beforehand. When the inert gas is to be pre-cooled in this way, the mixing section 22*b* including the mixing tube 29 can be omitted, thus further simplifying the manufacturing apparatus 21*a.*

Figure 4:
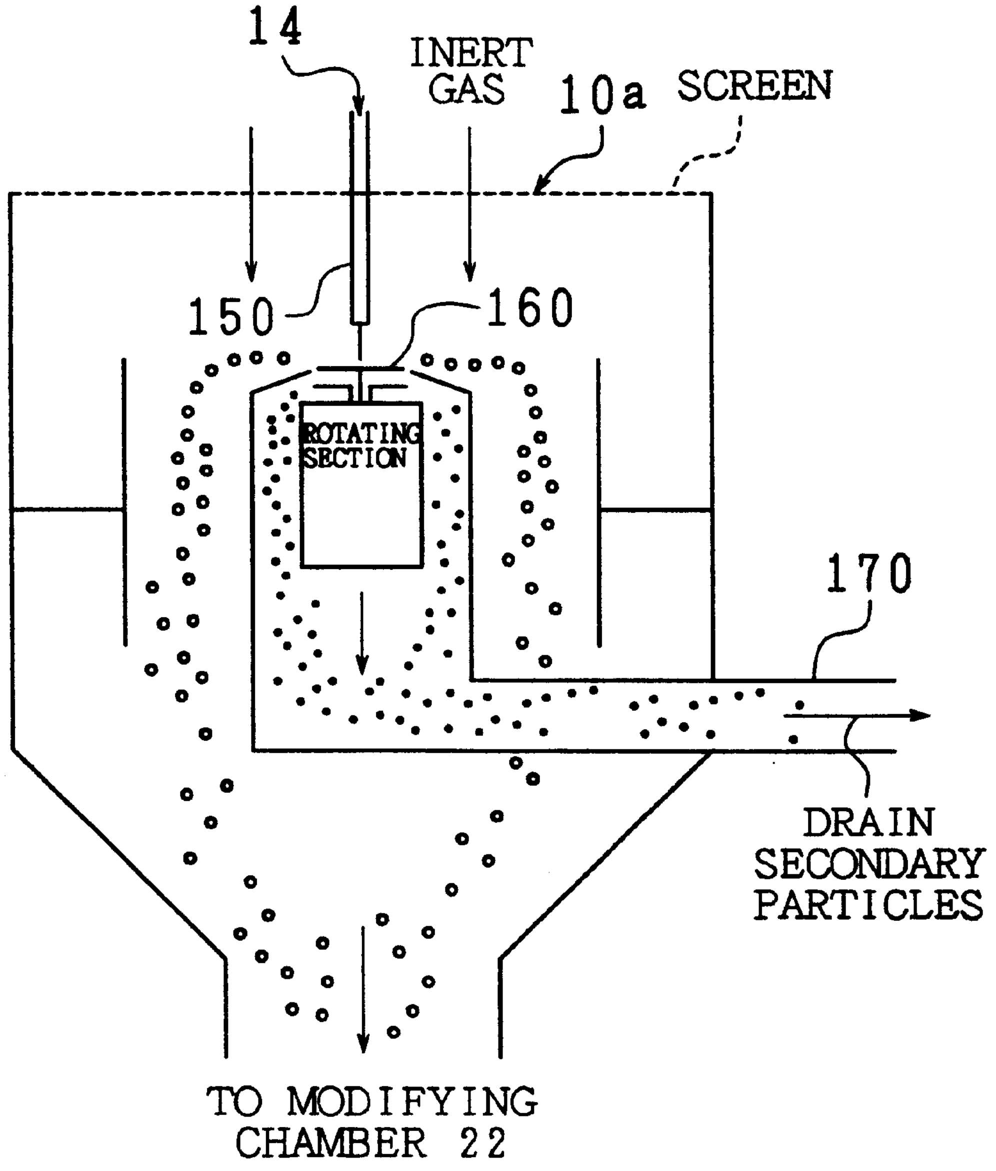
FIG. 4 is a schematic cross sectional view showing one modification example of a granulation device used in the manufacturing apparatus for producing the hydrophilic particles which are to be dispersed in the recording liquid of the present invention.

Further, even though the atomizer 10 was used as an example to adjust the liquid particles in the manufacturing apparatuses 21 and 21*a,* the adjusting method of liquid particles is not particularly limited, and as shown in FIG. 4, it is possible for example to use a granulation device 10*a* of an atomizer type which spins off a liquid film by a centrifugal force to form liquid particles as liquid droplets. The granulation device 10*a* of an atomizer type can produce liquid particles of a small particle size even when the concentration and viscosity of the solution 14 are high.

In the granulation device 10*a,* the solution 14 in which an yellow pigment as a hydrophobic substance is dissolved in an acidic liquid is supplied through a guiding tube 150 over a rotary plate 160 as a rotating section. The rotary plate 160 is rotating at a high revolution rate, and the solution 14 in the form of a liquid film on the rotary plate 160 is spun off from the periphery of the rotary plate 160 by a centrifugal force to be an aerosol (mist). The liquid particles in the form of an aerosol are carried to the modifying chamber 22 via the optical measuring device 3B by the inert gas (carrier). The liquid particles which are unnecessary, e.g., liquid particles which are too small in particle size, are selected out to be drained through a drainage 170.

Figure 5:
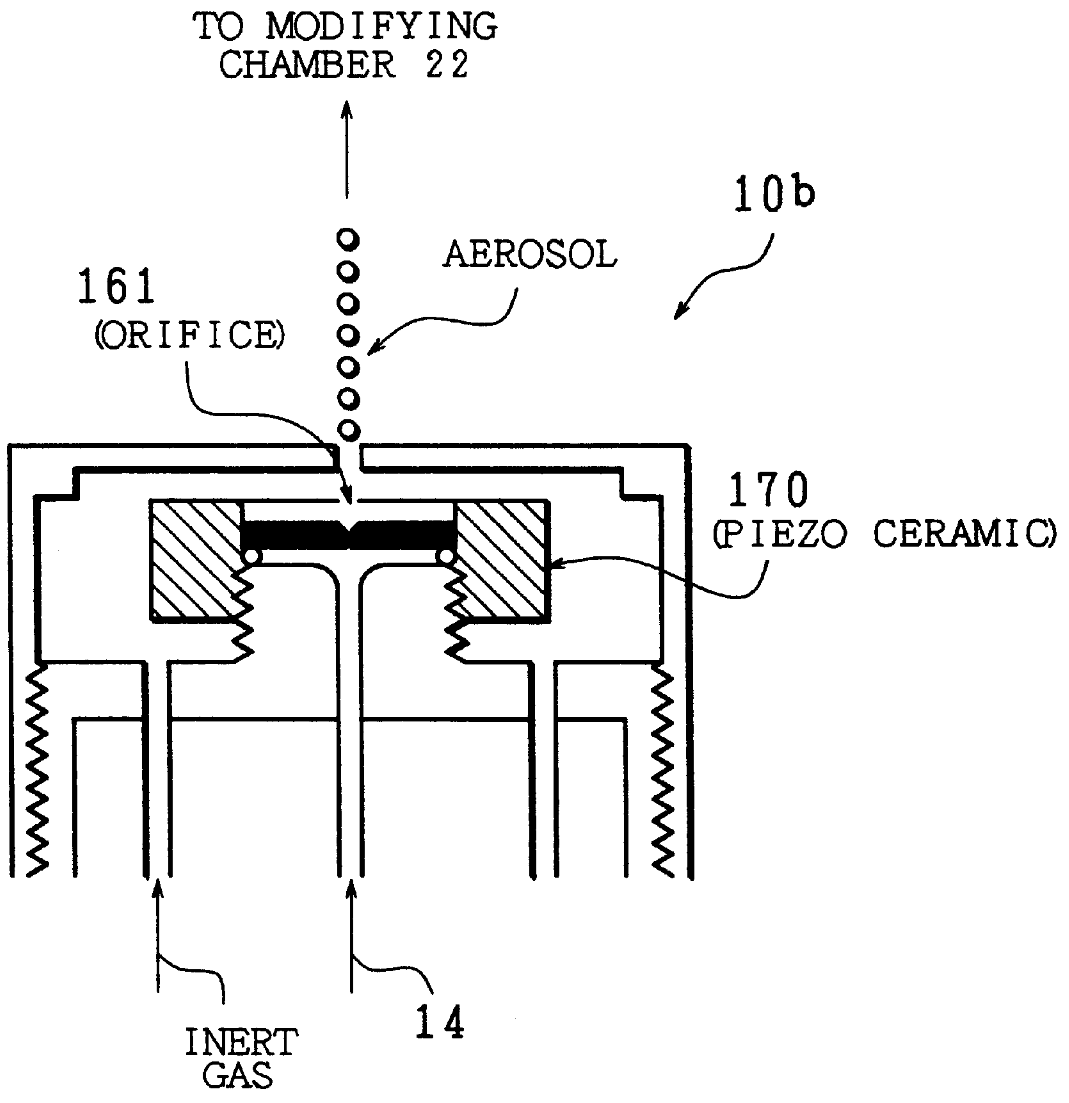
FIG. 5 is a schematic cross sectional view of another modification example of the manufacturing apparatus for producing the hydrophilic particles which are to be dispersed in the recording liquid of the present invention.

Further, instead of the atomizer 10, for example, as shown in FIG. 5, it is possible to use a granulating device lob which prepares the liquid particles from the solution 14 by applying vibrations of ultrasonic wave to the solution 14 as it is ejected out of an orifice. In the granulating device 10*b,* solution 14 is introduced into orifice 161 through an inlet tube (not shown), and the vibrations of ultrasonic wave are applied by a vibration member 170 such as a piezo element to the solution 14 being ejected from the orifice 161. The rate at which the liquid particles is generated is controlled by the vibration frequency of the vibration member 170. The liquid particles created are carried to the modifying chamber 22 by the inert gas (carrier) via the optical measuring device 3B.

Figure 6:
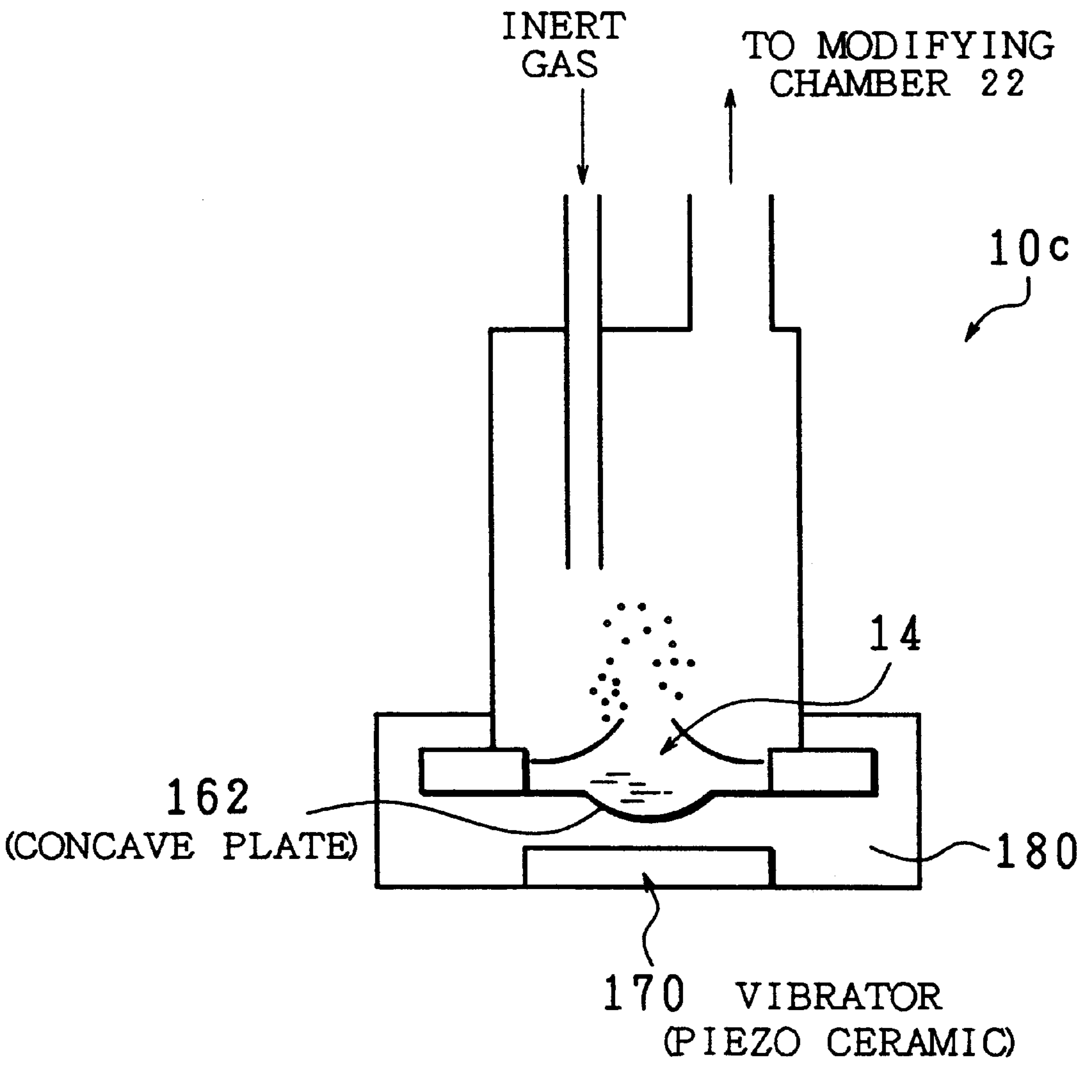
FIG. 6 is a schematic cross sectional view of yet another modification example of the manufacturing apparatus for producing the hydrophilic particles which are to be dispersed in the recording liquid of the present invention.

Further, instead of the atomizer 10, for example, as show in FIG. 6, it is also possible to adopt a granulating device 10*c,* which comprises another method of preparing liquid particles by vibrations. In the granulating device 10*c,* the solution 14 is introduced into a tank-shaped supply section 162 through an inlet tube (not shown). Below the supply section 162 is provided a vibration member 170 such as a piezo element, and between the supply section 162 and the vibration member 170 is filled with a medium 180 which transmits the vibrations from the vibration member 170.

The bottom portion of the supply section 162 is dipped downward to have a concave shape, by which the vibrations generated from the vibration member 170 are concentrated on the surface of the solution 14 in the supply section 162 via the bottom portion of the supply section 162, so as to promote generation of particles of the solution 14, i.e., generation of liquid particles. The device is supplied with an inert gas (carrier) from above, and the liquid particles generated are carried to the modifying chamber 22 via the optical measuring device 3B by the inert gas (carrier). The granulating devices 10*a,* 10*b,* and 10*c* are also applicable to the manufacturing apparatus 21 as described above, and also to manufacturing apparatuses 21*b* and 21*d* which will be described below.

[Manufacturing Apparatus 3]

Figure 7:
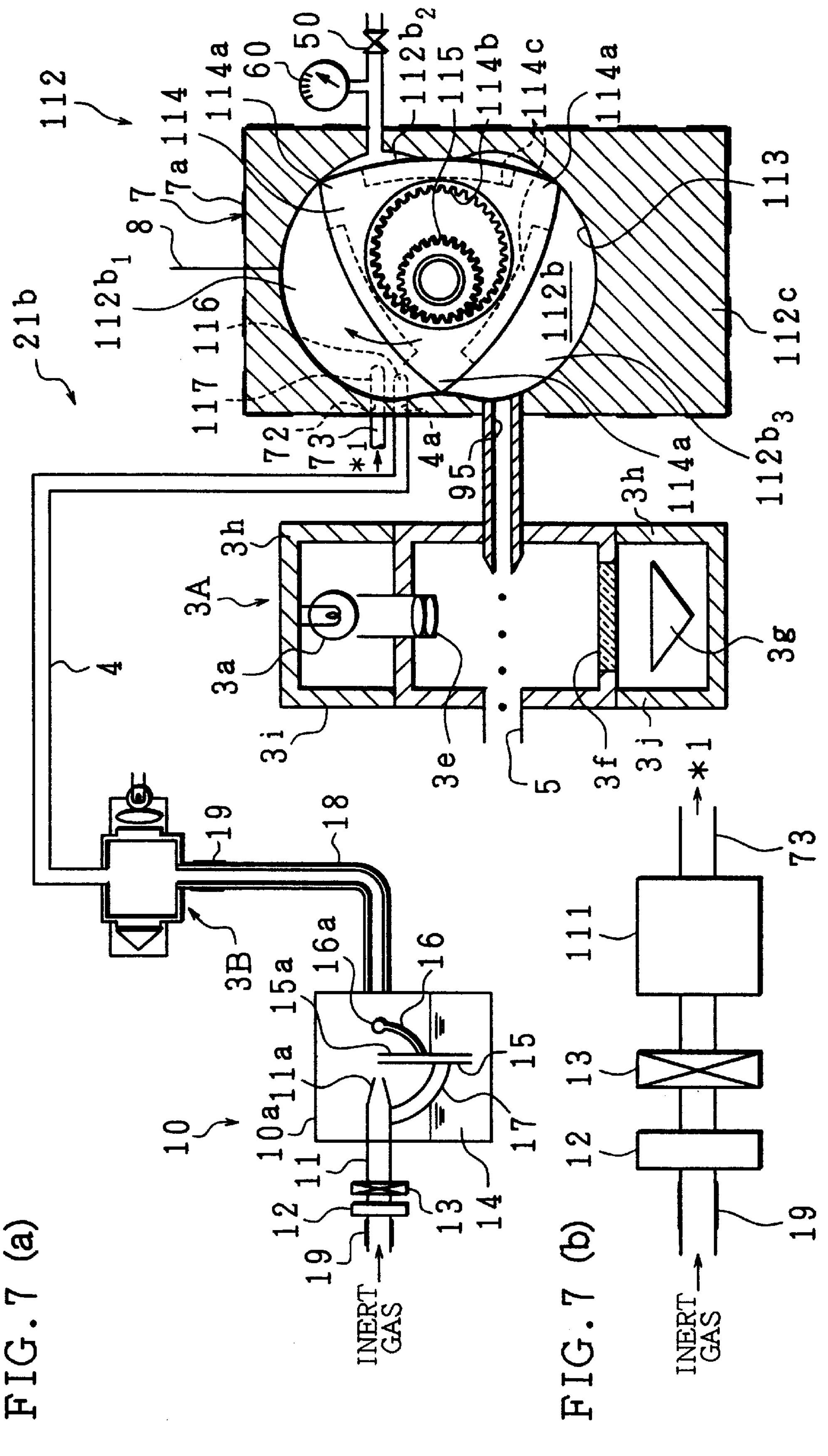
FIGS. 7(*a*) and 7(*b*) are schematic drawings showing yet another example of the manufacturing apparatus for producing the hydrophilic particles which are to be dispersed in the recording liquid of the present invention.

The manufacturing apparatus 21*b* of the hydrophilic particles as shown in FIGS. 7(*a*) and 7(*b*) is a modification example of the manufacturing apparatus 21 as described above. Note that, the members having the same functions as those described in the manufacturing apparatuses 21 and 21*a* are given the same reference numerals in FIGS. 7(*a*) and 7(*b*) and explanations thereof are omitted here.

The manufacturing apparatus 21*b* is provided with a modifying chamber which includes a vapor generating section 111 and a condensing section 112, instead of the modifying chamber 22 of the manufacturing apparatus 21 as described above. The vapor generating section 111 has a similar arrangement to that of the vapor generating section 22*a,* and generates vapor.

The condensing section 112 takes the form of a rotary gasoline engine and successively carries out compression and expansion adiabatically. Namely, the condensing section 112 includes a near polygonal pillar shaped rotary rotor 114 and an inner wall section 113 which is in contact with each apex 114*a* of the rotor 114 so that the volume of each processing space 112*b* created by each outer surface 114*c* between adjacent apices 114*a* of the rotor 114 and the inner wall section 113 facing the outer surface 114*c* is changed as processing space $112b_1$, $112b_2$, and $112b_3$ in accordance with the rotation of the rotor.

The inner wall section 113 is in the form of a "gourd" with partially overlapping two circles in the cross section taken along the line orthogonal to the rotational axis of the rotor 114, and the rotor 114 includes therein a gear 114*b* of internal tooth, and in the rotor 114, a driving gear 115 of external tooth, which is smaller than the gear 114*b* is in planetary mesh with the gear 114*b*. As a result, the rotor 114 can rotate while maintaining contact between each apex 114*a* and the inner wall section 113.

Here, in some cases, one of the outer surfaces 114*c* of the rotor 114 might contact a protrusion on the inner wall section 113. However, by a depression provided at the middle portion of each outer surface 114*c,* the processing space 112*b* created between adjacent apices 114*a,* e.g., the processing space 112$b_2$ is prevented from being divided by the protrusion of the outer surface 114*c* between adjacent apices 114*a*.

The following describes a producing method of hydrophilic particles using the manufacturing apparatus 21*b*. First, the rotor 114 is set in position as shown in FIG. 7(*a*), and the vapor generated in the vapor generating section 111 is supplied to the processing space 112*b* via vapor supply tube 73. Meanwhile, liquid particles are drawn into the processing space 112*b* through the particle inlet 4*a* via particle supply tube 4 from the atomizer 10. Here, respective openings 117 and 116 of the condensing agent inlet 72 and particle inlet 4*a* open into the processing space 112*b* (as in the processing space 112$b_1$).

Then, one of the apices 114*a,* which was defining the processing space 112*b* in the counter clockwise direction passes through the openings 117 and 116 in accordance with the rotation of the rotor 114 in a direction of the arrow (clockwise direction) in FIG. 7 according to control means such as a microcomputer (not shown), and the processing space 112*b* is disconnected from the vapor supply tube 73 and particle inlet 4*a,* thus sealing the processing space 112*b* as it moves inside the condensing section 112 in the clockwise direction.

Then, to obtain saturated vapor of the condensing agent in the condensing section 112, the processing space 112*b* is pressurized and heated. The pressure is applied while rotating the rotor 114 in the clockwise direction (rotated by 180° from the state as shown in FIG. 7(*a*)). In this pressurization, the pressure inside the processing space 112*b* (as in the processing space 112$b_2$) is increased to a predetermined pressure which is higher than an ordinary pressure (atmospheric pressure) The pressure in the processing space 112*b* (as in the processing space 112$b_2$) is measured by a pressure gauge 60 and is set at a predetermined pressure by a pressure adjuster 50 based on the measured value.

Heating is carried out by the heating device 7. When the heating device 7 comes into operation, the heat generated from a heater 7*a* is transferred through the wall section 112*c* and inner wall section 113 to heat each processing space 112*b*. The temperature in each processing space 112*b* is measured by a thermometer 8, and the operation of the heating device 7 is controlled based on the measured temperature value.

Then, the rotor 114 is left for an appropriate period. Namely, the current state is maintained with respect to the condensing section 112. In order to obtain saturated vapor, at least the pressurization as described above is required and heating is carried out supplementarily as required. This is also true for the other examples described below.

By the described process, the saturated vapor of the condensing agent is obtained in the processing space 112*b* (as in the processing space 112$b_2$). In this state, the vapor of the condensing agent exists to surround the liquid particles. Then, the rotor 114 is further rotated, and by adiabatically reducing the pressure inside the processing space 112*b* to an ordinary pressure, the saturated vapor of the condensing agent is supersaturated. As a result, the saturated vapor of the condensing agent is supersaturated in the processing space 112*b* containing the liquid particles, and the condensation reaction of the condensing agent vapor takes place on the surface of the liquid particles. As a result, a liquid film is created over the surface of the liquid particles, thus depositing the hydrophilic particles in the described manner.

The hydrophilic particles thus deposited are retrieved via the optical measuring device 3A and particle outlet tube 5 by opening the processing space 112*b* (as in the processing space 112$b_3$) into the particle outlet 95 of the condensing section 112 by further rotating the rotor 114, and the hydrophilic particles are washed in the described manner and are dried to be used.

Note that, even though the above described the case where the condensing agent is drawn as vapor through the condensing agent inlet 72, it is possible alternatively to generate the saturated vapor in the processing space 112*b* using the heating device 7 by providing a porus material at least partially on the depression provided at the middle portion of each outer surface 114*c* of the rotor 114, and by making the condensing agent adhered to the porus material in advance or by making the porus material impregnated with the condensing agent in advance.

[Manufacturing Apparatus 4]

Figure 8:
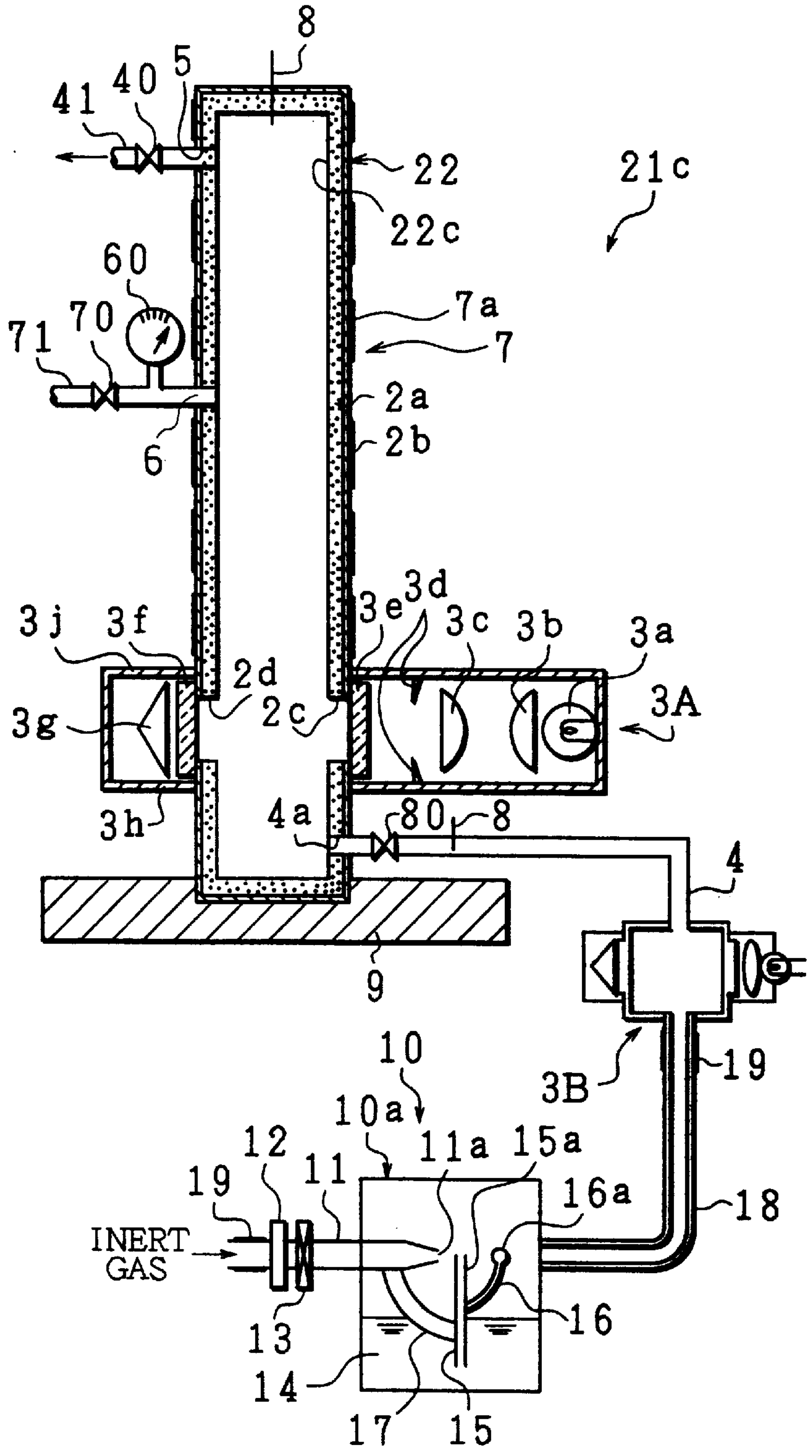
FIG. 8 is a schematic drawing showing still another example of the manufacturing apparatus for producing the hydrophilic particles which are to be dispersed in the recording liquid of the present invention.

The manufacturing apparatus 21*c* of hydrophilic particles as shown in FIG. 8 is a modification example of the manufacturing apparatus 21 as described above. Note that, the members having the same functions as those described in the manufacturing apparatuses 21, 21*a,* and 21*b* are given the same reference numerals in FIG. 8 and explanations thereof are omitted here.

The arrangement of the manufacturing apparatus 21*c* will be described in the context of the producing method of hydrophilic particles using the manufacturing apparatus 21*c*. First, to describe the producing method, the condensing agent such as water is adhered to or impregnated in advance into the inner wall section 2*a* of the modifying chamber (condensation room) 22 which is fixed straight up on a base plate 9, and the vapor generating space 22*c* of the modifying chamber 22 is replaced with a purified gas such as purified air, which contains no impurity which may turn into a core.

Then, the modifying chamber 22 is sealed. Here, the liquid particles are drawn for example as an aerosol into the modifying chamber 22 through the particle inlet 4*a* via particle supply tube 4 from the atomizer 10. Thus, valves 80 and 40 of the particle supply tube 4 and particle drainage 41, respectively, are open when drawing the liquid particles, and they are closed after the air in the modifying chamber 22 is replaced with an aerosol of the liquid particles from the atomizer 10 to seal the modifying chamber 22.

Then, to obtain saturated vapor of the condensing agent in the modifying chamber 22, inside the modifying chamber 22 is pressurized and heated. The pressure is applied by opening the valve 70 and by introducing a purified gas into the modifying chamber 22 through a pressurization/depressurization pipe 71 and pressurization/depressurization opening 6. In this pressurization, the pressure in the modifying chamber 22 is increased to a predetermined pressure, which is higher than an ordinary pressure. The pressure in the modifying chamber 22 is measured by a pressure gauge 60, and upon reaching a predetermined pressure, the valve 70 is closed.

Heating is carried out by the heating device 7. When the heating device 7 comes into operation, the heat generated from a heater 7*a* is transferred through the outer wall section 2*b,* inner wall section 2*a,* and vapor generating space 22*c,* heating these components in the course of transfer. The temperature in the vapor generating space 22*c* is measured by a thermometer 8, and the operation of the heating device 7 is controlled based on the measured temperature value.

Then, the modifying chamber 22 is left for an appropriate period. To obtain saturated vapor, at least the described pressurization is required, and heating is carried out supplementarily as required. This is also true for the other examples described below. The described operations are controlled by control means such as a microcomputer (not shown) based on the detected values of temperature, particle size, concentration of particles, and pressure, etc.

By the described process, the saturated vapor of the condensing agent is obtained in the modifying chamber 22. In this state, the vapor of the condensing agent exists to surround the liquid particles. Then, the pressure in the modifying chamber 22 is adiabatically reduced to an ordinary pressure to supersaturate the saturated vapor of the condensing agent. To do this, the valve 70 of the pressurization/depressirization tube 71 is opened and inside the modifying chamber 22 is equalized with atmosphere so as to adiabatically expand the saturated vapor of the condensing agent in the vapor generating space 22*c*.

Thus, the saturated vapor of the condensing agent is supersaturated in the vapor generating space 22*c* containing the liquid particles, and the condensation reaction of the condensing agent vapor takes place on the surface of the liquid particles. As a result, a liquid film is formed over the surface of the liquid particles and there occurs deposition of the liquid particles as modified in the described manner. The valve 70 is closed immediately after the adiabatic expansion takes place.

The hydrophilic particles thus deposited are retrieved from the modifying chamber 22 via the optical measuring device 3A and particle outlet tube 5, and after washed in the described manner, the hydrophilic particles are dried to be used. When retrieving, the valves 80 and 40 of the particle supply tube 4 and particle drainage 41, respectively, are opened, and, for example, by drawing a purified gas into the modifying chamber 22 through the particle supply tube 4, the hydrophilic particles in the vapor generating space 22*c* of the modifying chamber 22 are drained off through the particle drainage 41 to replace inside the vapor generating space 22*c* with a purified gas.

When supplying (drawing) the liquid particles into the vapor generating space 22*c* through particle supply tube 4, the liquid particles passing through the particle supply tube 18 may be cooled beforehand as required by the cooling device 19. Alternatively, the liquid particles to be supplied into the vapor generating space 22*c* may be cooled beforehand by providing the cooling device 19 on the preceding stage of the atomizer 10 and by cooling the inert gas beforehand.

[Manufacturing Apparatus 5]

Figure 9:
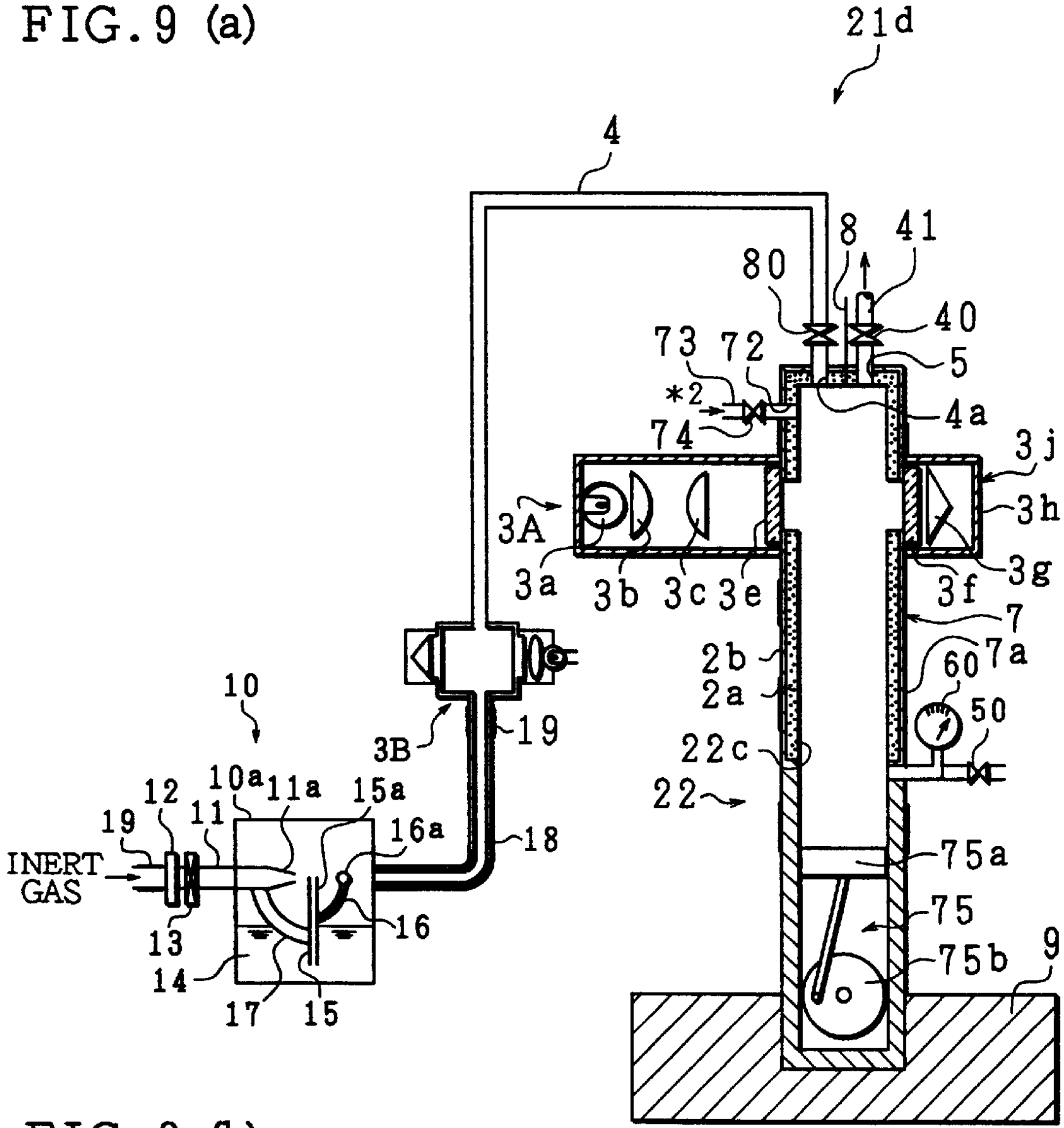
FIGS. 9(*a*) and 9(*b*) are schematic drawings showing still another example of the manufacturing apparatus for producing the hydrophilic particles which are to be dispersed in the recording liquid of the present invention.
Figure 9:
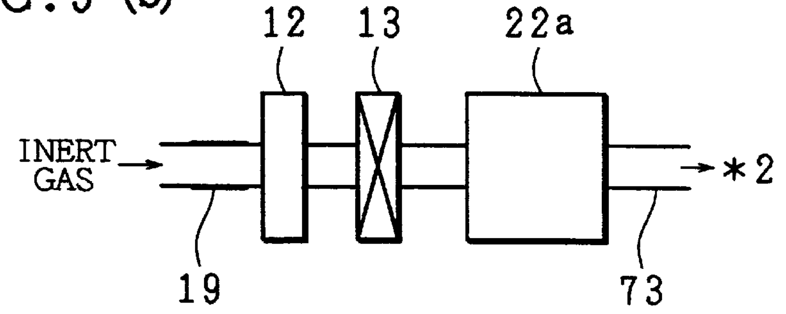

The manufacturing apparatus 21*d* of hydrophilic particles as shown in FIGS. 9(*a*) and 9(*b*) is a modification example of the manufacturing apparatuses 21, 21*a*, 21*b*, and 21*d* as described above. Note that, the members having the same functions as those described in the manufacturing apparatuses 21, 21*a*, 21*b*, and 21*c* are given the same reference numerals in FIGS. 9(*a*) and 9(*b*) and explanations thereof are omitted here.

The arrangement of the manufacturing apparatus 21*d* will be described in the context of the producing method of hydrophilic particles by the manufacturing apparatus 21*d*. First, to describe the producing method, a piston 75*a* of a pressurize/depressurize piston 75 is brought down by a crank section 75*b* so as to increase the volume of a processing space of the vapor generating space 22*c*, and the liquid particles carried through the particle supply tube 4 from the atomizer 10 are drawn, for example, as an aerosol into the vapor generating space 22*c* of the modifying chamber 22 through the particles supply tube 4, and the condensing agent such as water are drawn as vapor into the vapor generating space 22*c* of the modifying chamber 22 from the condensing agent inlet 72.

Thus, in this case, the respective valves 80 and 74 of the particle inlet 4*a* and condensing agent inlet 72 are opened, and the valve 40 of the particle outlet tube 5 is closed. The bottom portion of the vapor generating space 22*c* is shaped into a cylindrical form so that the piston 75*a* can move up and down to increase and reduce the pressure in the vapor generating space 22*c*.

When the piston 75*a* is brought down to the bottom most position, the valves 80 and 74 are closed to seal the vapor generating space 22*c*. Then, to obtain the saturated vapor of the condensing agent in the vapor generating space 22*c*, the vapor generating space 22*c* is pressurized and heated. The pressure is applied by bringing up the piston 75*a*. In this pressurization, the pressure inside the vapor generating space 22*c* of the modifying chamber 22 is increased to a predetermined pressure, which is higher than an ordinary pressure. The pressure in the vapor generating space 22*c* is measured by a pressure gauge 60 and is set to a predetermined pressure by a pressure adjuster 50.

Heating is carried out by the heating device 7. When the heating device 7 comes into operation, the heat generated from the heater 7*a* is applied to the outer wall section 2*b*, inner wall section 2*a*, and vapor generating space 22*c*, heating these components in the process. The temperature in the vapor generating space 22*c* is measured by a thermometer 8, and the operation of the heating device 7 is controlled based on the measured temperature value.

Then, the modifying chamber 22 is left for an appropriate period until the saturated vapor of the condensing agent such as water is obtained. To obtain saturated vapor, at least the described pressurization is required, and heating is carried out supplementarily as required. The described operations are controlled by control means such as a microcomputer (not shown) based on the detected values of temperature, particle size, concentration of particles, and pressure.

By the described process, saturated vapor of the condensing agent is obtained in the modifying chamber 22. In this state, the vapor of the condensing agent exists to surround the liquid particles. Then, the pressure in the modifying chamber 22 is adiabatically reduced to an ordinary pressure to supersaturate the saturated vapor of the condensing agent. To do this, the piston 75*a* is brought down to the bottom most position (initial position) so as to adiabatically expand the saturated vapor of the condensing agent in the vapor generating space 22*c*.

Thus, in the vapor generating space 22*c* containing the liquid particles, the saturated vapor of the condensing agent is supersaturated, and the condensation reaction of the condensing agent vapor takes place on the surface of the liquid particles. As a result, a liquid film is formed over the surface of the liquid particles, and there occurs deposition of the hydrophilic particles as modified in the described manner. The particle size of the hydrophilic particles is measured by the optical measuring device 3A.

The hydrophilic particles thus deposited are retrieved from the modifying chamber 22 via particle outlet tube 5 and particle drainage 41, and after washed in the described manner, the hydrophilic particles are dried to be used. The retrieval is carried out while the respective valves 80 and 74 of the particle inlet tube 4*a* and condensing agent inlet 72 are closed and the valve 40 of the particle outlet tube 5 is open, and by bringing up the piston 75*a* to the upper most position from the bottom most position.

Note that, the above described the case where the condensing agent is drawn as vapor through the condensing agent inlet 72. However, it is possible alternatively to generate the saturated vapor in the vapor generating space 22*c* using the heating device 7 by forming the inner wall section 2*a* of the modifying chamber 22 at least partially with a porus material and by making the condensing agent adhered to the porus material in advance or by making the porus material impregnated with the condensing agent in advance.

Alternatively, when supplying (drawing) the liquid particles into the vapor generating space 22*c* through particle supply tube 4, the liquid particles passing through the particle supply tube 18 may be cooled as required by the cooling device 19. As another alternative, the liquid particles to be supplied into the vapor generating space 22*c* may be cooled beforehand by providing the cooling device 19 on the preceding stage of the atomizer 10 and by cooling the inert gas beforehand.

As is clear from the foregoing explanations, the manufacturing apparatuses 21 through 21*d* as described above are all for producing yellow pigment particles which are rendered hydrophilic at least on the surface, using as a raw material a hydrophobic yellow pigment having a fine particle size and which aggregate easily in a liquid. Specifically, the yellow pigment is dissolved in an acidic liquid to prepare a solution, and the solution thus prepared is made into liquid droplets and by diluting the liquid droplets (liquid particles) by allowing the vapor including water vapor to condense on the liquid droplets (liquid particles), hydrophilic particles having a substantially uniform size are deposited.

Thus, with the manufacturing apparatuses 21 through 21*d,* compared with a conventional manufacturing apparatus of a batch type, etc., the amount of chemicals used can be reduced, and it is also possible to carry out the process continuously. Further, because the liquid particles and hydrophilic particles can be carried by a gas, the arrangement and operation of the apparatus can be simplified, and the hydrophilicity rendering process can be performed in a shorter period of time. Further, because the product hydrophilic particles do not carry charge and do not aggregate, a step of separating the hydrophilic particles can be omitted, thus inexpensively producing hydrophilic particles having a small and substantially uniform particle size.

When using the manufacturing apparatuses 21 through 21*d,* the degree of hydrophilicity of the hydrophilic particles can be adjusted. For example, when the degree of hydrophilicity needs to be reduced, the solution 14 is prepared by reducing the time for dissolving the solution 14 in an acidic liquid, and subsequently the solution 14 is made into liquid droplets, and then by diluting the solution 14 by allowing the vapor including water vapor to condense in the solution 14, the hydrophilic particles are deposited. Namely, by adjusting the step of dissolving the yellow pigment into an acidic liquid, hydrophilic particles having a desired degree of hydrophilicity can be produced.

Note that, evidently, the production of the yellow pigment particles (hydrophilic particles) which are rendered hydrophilic at least on the surface may not necessarily be carried out by the methods in accordance with the manufacturing apparatuses 21 through 21*d* as described above. Further, by "exposing (contacting) the liquid particles to a supersaturated atmosphere of vapor including water vapor", it is meant to indicate not only the case where the supersaturated atmosphere of vapor is created after creating the liquid particles of the vapor but also the case where the supersaturated atmosphere is created beforehand and the liquid particles are introduced therein.

The hydrophilic particles thus produced are dispersed in a liquid as described above, thereby preparing the recording liquid in accordance with the present invention. The dispersing method of the hydrophilic particles is not particularly limited and any method can be adopted, provided that the hydrophilic particles are uniformly dispersed in the recording liquid. Specifically, for example, the recording liquid may be shaken in a sealed container (a shaker may be used), or the recording liquid may be stirred using a stirring rod and stirrer. Further, the recording liquid may be vibrated by a ultrasonic wave. Further alternatively, when the dispersion of the product hydrophilic particles in the liquid is desirable, the mixed solution may be left alone so as to allow uniform dispersion of the hydrophilic particles in the liquid.

Of those dispersing methods as noted above, the method using a ultrasonic wave is particularly preferable for its simplicity. Also, when adopting the method using a ultrasonic wave or the method using a homogenizer as a stirrer, the hydrophilic particles can be dispersed at a micro level, thus preventing aggregation of hydrophilic particles and realizing a recording liquid with a superior preservation stability.

The recording liquid of the present invention in which the hydrophilic particles as described above are dispersed in a liquid is hardly colored by the hydrophilicity rendering process of the yellow pigment, and it has a superior quality by itself in spray stability, preservation stability, and water-resistance of a recorded image, etc. by the fact that the hydrophilic particles are rendered hydrophilic (e.g., sulfonated) at least on the surface.

That is, because the hydrophilic particles are rendered hydrophilic at least on the surface, the hydrophilic particles blend well with the liquid. Thus, when dispersed in the liquid, the hydrophilic particles are uniformly dispersed without sitting on a liquid surface and do not aggregate each other. Therefore, the recording liquid of the present invention can maintain the uniformly dispersed state of the hydrophilic particles as a recording material for an extended period of time, thus having a superior spray stability and preservation stability.

Meanwhile, the hydrophilic particles are also hydrophobic by the intrinsic property of the yellow pigment. For this reason, the fixability of the recording liquid is desirable regardless of whether the surface (recording surface) of the recording medium is hydrophilic or hydrophobic. Further, the hydrophilic particles prepared from the chemically stable yellow pigment rarely undergo changes in color fidelity and color tone with respect to the color of the original yellow pigment, and the recording liquid in which the liquid particles are dispersed has desirable color fidelity and color tone.

To further improve the property of the recording liquid, it is possible to add a lubricant, anti-spreading agent, water-soluble dye, and solubilizing agent, etc., as required, by which the property of the recording liquid and the fixability (no spreading) on the recording medium can be further improved.

Note that, when adopting an ink jet recording device in which the recording liquid is ejected by the effect of thermal energy, the recording liquid is prepared such that the value of thermal property of the recording liquid falls within an appropriate range.

The recording liquid of the present invention has a superior property as a recording liquid for use in ink jet recording, but the use is not just limited to this. For example, when used as to a recording liquid of writing tools such as a ball point pen and marking pen which make recording on a recording medium such as paper (the surface of recording medium may be hydrophilic or hydrophobic), a high quality image with superior water resistance and light resistance and having a clear color tone and sufficient thickness can be created on the recording medium.

The following will describe various properties of the recording liquid as evaluated in the Examples described below, and the measuring methods thereof.

A) Spray Stability 10 ml of recording liquid was placed in a recording liquid tank of an ink jet recording device having a glass nozzle with an opening diameter of 30 °m. Then, the recording liquid was sprayed once, and under this condition, the recording liquid was left for 3 days, 7 days, 14 days, 30 days, 60 days, and 90 days at room temperature, and after each duration of storage, the recording liquid was sprayed so as to check for clogging of the glass nozzle. Each evaluation value indicates the maximum days of storage which allowed the recording liquid to be sprayed without clogging.

B) Preservation Stability

Two Pyrex test tubes, each sealing 15 ml of recording liquid were prepared, and the test tubes were left for one month at temperatures of 0° C. and 50° C., respectively, to check for the presence or absence of deposition.

C) Water Resistance

Jet recording was performed on sheets of high grade paper using the ink jet recording device used for the measurement of spray stability, and the high grade paper after recording was soaked in water to see if any change had occurred, and no change was denoted by ○, and a change in recording condition such as a spread ink and reduced ink thickness was denoted by X.

D) Spreading

Jet recording-was performed on sheets of high grade paper using the ink jet recording device having a glass nozzle with an opening diameter of 30 $\mu$m to see whether spreading of the recording liquid sprayed on the high grade paper had occurred by visual inspection in four levels. Note that, the larger the number, the lesser the degree of spread, and "1" indicates the presence of spread, "2" indicates some presence of spread, "3" indicates almost no spread, and "4" indicates no spread.

E) Color Fidelity and Color Tone

Color fidelity and color tone were evaluated by visual inspection. Specifically, as compared with the recording liquid of Example 1 to be described below, improved transparency was denoted by ◎, no difference was denoted by ○, and less quality was denoted by X. Note that, as will be described below, the recording liquid of Example 1 has the same color fidelity and color tone as that of the comparative suspension liquid of Example 1 (suspension of the yellow pigment in pure water before the pigment is rendered hydrophilic), and thus the evaluation of color fidelity and color tone as compared with the yellow pigment before it is rendered hydrophilic can be indirectly made by this measurement.

The following will describe the present invention more specifically but the present invention is not limited to the following by any means. Note that, in the following Examples, the yellow pigment particles which are rendered hydrophilic will be referred to as hydrophilic particles, and the yellow pigment before it is rendered hydrophilic will be referred simply as a yellow pigment so as to distinguish the two from each other.

EXAMPLE 1

The hydrophilic particles were produced using the manufacturing apparatus 21 as shown in FIG. 2. Evidently, the hydrophilic particles can also be produced using the other manufacturing apparatuses 21*a* through 21*d* (FIG. 3, FIGS. 7(*a*) and 7(*b*), FIG. 8, FIGS. 9(*a*) and 9(*b*)) under the same conditions.

As the yellow pigment, Fast Yellow F5G (provided by SANYO COLOR WORKS, LTD.) having a mono-azo structure was used. 1 g of Fast Yellow F5G was dissolved in 100 ml of 98% sulfuric acid (concentrated sulfuric acid) as an acidic liquid and the solution was left for about an hour so as to prepare solution 14. Subsequently, the solution 14 was introduced into the atomizer 10.

In the vapor generating section 22*a,* after storing water 20 in the reservoir 2*c,* the modifying chamber 22 was closed and the vapor generating section 22*a* was heated using the heating device 7 so as to generate saturated water vapor.

Then, liquid particles were formed by the atomizer 10, and the liquid particles were cooled by the cooling device 19 and were drawn into the mixing tube 29 as a condenser via particle supply tubes 18 and 4. After supplying the liquid particles, the mixing tube 29 was cooled using the cooling device 30, by which the saturated vapor was cooled and supersaturated water vapor (supersaturated atmosphere) was created, thus condensing water on the surface of the liquid particles. As a result, the pigment contained in the liquid particles was deposited, thus producing the hydrophilic particles which are dispersed in the recording liquid of the present invention. The hydrophilic particles thus obtained were taken out of the modifying chamber 22 through the particle outlet tube 5 for retrieval. The liquid particles may further be washed as required by extra-pure water. The particle size of the hydrophilic particles was around 80 nm.

Then, to the hydrophilic particles was added pure water (liquid) so that the proportion of the hydrophilic particles in the mixture was 1% by weight, and subsequently, using a ultrasonic wave dispersing instrument (ut-105, provided by Sharp Corporation), a ultrasonic wave was applied to the pure water for 10 minutes to disperse the hydrophilic particles therein. Then, the mixture was filtered through a 0.5 $\mu$m membrane filter so as to prepare yellow ink (1) as the recording liquid in accordance with the present invention.

Meanwhile, pure water was also added to the yellow pigment Fast Yellow F5G so that the proportion of the Fast Yellow F5G in the mixture was 1% by weight so as to prepare a comparative suspension liquid by the same method as the preparation method of the yellow ink (1).

The yellow ink (1) had a more desirable color fidelity without coloration as compared with the suspension liquid. As for the suspension liquid, since the yellow pigment is hydrophobic, it is not wet by the extra-pure water. Thus, when the suspension liquid was left alone, the yellow pigment did not mix with the extra-pure water and it floated on the water surface. In contrast, in yellow ink (1) in accordance with the present Example, since the yellow pigment particles are hydrophilic, the particles were easily mixed with the extra-pure water and were uniformly dispersed in the yellow ink (1), uniformly floating therein.

Figure 1B:
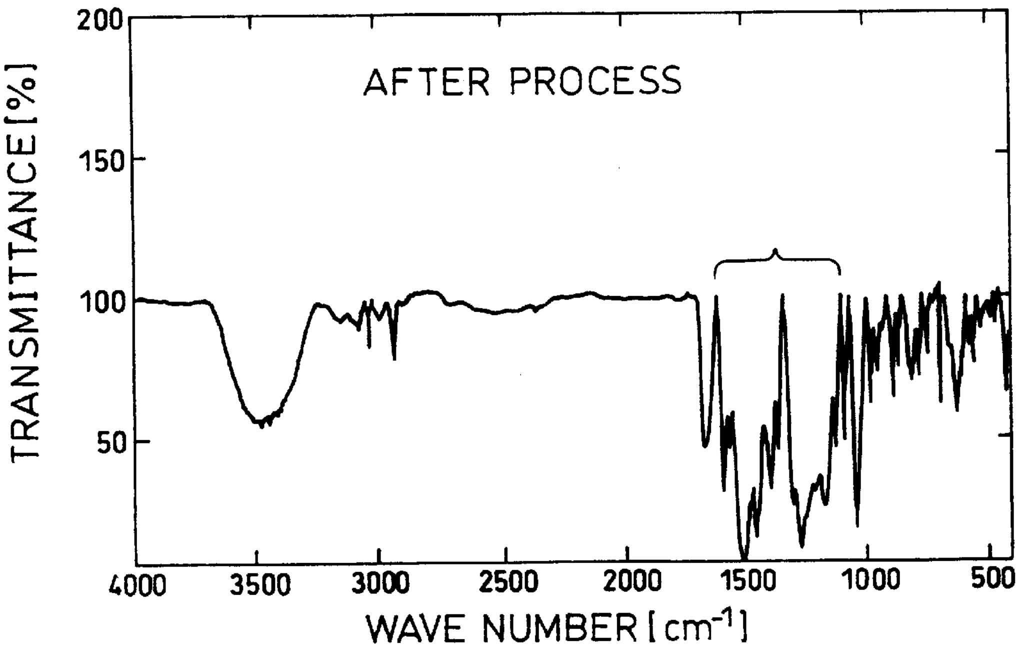

Then, an IR absorption spectrum was taken with respect to the surface of the hydrophilic particles contained in yellow ink (1) and also with respect to the surface of the yellow pigment contained in the suspension liquid. It was found by the results of measurement that, as shown in FIGS. 1(*a*) and 1(*b*), a sulfonic acid group (shown in FIG. 1(*b*)), which was not present before the hydrophilicity rendering process, was introduced (i.e., sulfonation). Namely, it was confirmed that the wettability of yellow ink (1) with respect to the pure water (liquid) had improved due to the introduction of a sulfonic acid group on the surface of the yellow pigment particles.

Then, various properties of (A) spray stability, (B) preservation stability, (C) water resistance, (D) spreading, and (E) color fidelity and color tone as noted above were measured with respect to yellow pigment (1). The results of measurement are shown in Table 1 together with the results of measurement of Examples 2 to 5 and Comparative Examples 1 to 4.

The yellow ink (1), as a water soluble ink for writing tools, was charged into a ball point pen or marking pen, and time stability test and water resistance test A were performed.

In time stability test, the ball point pen or marking pen filled with the yellow ink (1) was laid down and left for 15 days and 30 days, and the condition of writing on writing paper (JIS P 3201) was observed. The evaluation was made such that the writing with the same quality as that of writing made out of a newly charged yellow ink (1) was denoted by ○, and the writing which exhibited a deteriorated writing condition such as blurring was denoted by X.

In water resistant test A, writing was made on writing paper (JIS P 3201) using a ball point pen or marking pen filled with yellow ink (1), and after the elapsed time of 30 seconds, the writing paper was dipped into water to evaluate the writing quality, in which no change was denoted by ○, and writing with spread or writing which turned pale was denoted by X. The results of time stability test and water resistance test A are shown in Table 2 together with the results of measurement of Examples 2 to 5 and Comparative Examples 1 to 4 to be described later. Note that, in Table 2, the results of water resistance test A are represented by water resistance A.

EXAMPLE 2

Pure water (liquid) was added to the hydrophilic particles as obtained in Example 1, ammonium polyacrylate (anti-spreading agent), diethyleneglycol (serving both as a liquid and lubricant), glycerine (serving both as a liquid and lubricant), and "BT-7" (provided by Nikko Chemicals Co., Ltd.) as a surfactant (solubilizing agent), and by stirring the mixture the hydrophilic particles were dispersed to prepare a dispersion liquid. The proportions of the hydrophilic particles, ammonium polyacrylate, diethyleneglycol, glycerine, and BT-7 in the dispersion liquid were 1% by weight, 1% by weight, 7.5% by weight, 2.5% by weight, and 1% by weight, respectively.

Then, the dispersion liquid was filtered by the same method as that of Example 1 to prepare yellow ink (2) as the recording liquid in accordance with the present Example. The yellow ink (2) had the same color fidelity without coloration as that of yellow ink (1). Also, yellow ink (2) was evaluated for dryness by the drying time by jet recording yellow ink (2) on high grade paper, which revealed that the dryness was desirable as with yellow ink (1).

The measurements of various properties (A) to (E) were also conducted with respect to yellow ink (2) as with yellow ink (1). The results are shown in Table 1.

Then, the yellow ink (2), as a water soluble ink of a writing tool, was charged into a ball point pen or marking pen to perform time stability test and water resistant test A by the same methods as that of Example 1. The results are shown in Table 2.

Comparative Example 1

Comparative yellow ink (a) was prepared under the same conditions and by the methods as that of Example 2 except for the yellow pigment Fast Yellow F5G, which was used instead of the hydrophilic particles.

The measurements of various properties (A) to (E) were also conducted with respect to yellow ink (a) as with yellow ink (1). The results are shown in Table 1.

The yellow ink (a), as a water soluble ink of a writing tool, was charged into a ball point pen or marking pen to perform time stability test and water resistant test A by the same methods as that of Example 1. The results are shown in Table 2.

EXAMPLE 3

The co-polymer of vinyl alcohol and acrylic acid, "KRASTMER AP-2" (provided by Kuraray Co., Ltd.), was added as the anti-spreading agent instead of ammonium polyacrylate to the dispersion liquid in an amount of 3.0% by weight, and subsequently, using the ultrasonic wave dispersing instrument used in Example 1, a ultrasonic wave was applied for 10 minutes to the dispersion liquid containing the hydrophilic particles to disperse the hydrophilic particles in the dispersion liquid.

Then, the dispersion liquid was filtered through a 0.5 $\mu$m membrane filter so as to prepare yellow ink (3) as the recording liquid in accordance with the present Example. Yellow ink (3) had a desirable color fidelity without coloration as compared with yellow ink (1). The yellow ink (3) was also evaluated for dryness with respect to yellow ink (1) by the same method as that of Example 2, which revealed that the drying time was almost the same as that of yellow ink (1). The measurements of various properties (A) to (E) were also conducted with respect to yellow ink (3) as with yellow ink (1). The results are shown in Table 1.

Then, yellow ink (3), as a water soluble ink of a writing tool, was charged into a ball point pen or marking pen so as to perform the time stability test and water resistance test A by the same methods as that of Example 1. The results are shown in Table 2.

Comparative Example 2

Comparative yellow ink (b) was prepared by the same method as that of Example 3 except for the yellow pigment Fast Yellow F5G, which was used instead of the hydrophilic particles.

The measurements of various properties (A) to (E) as noted above were also conducted with respect to yellow ink (b). The results are shown in Table 1.

Then, yellow ink (b), as a water soluble ink of a writing tool, was charged into a ball point pen or marking pen so as to perform the time stability test and water resistance test A by the same methods as that of Example 1. The results are shown in Table 2.

EXAMPLE 4

A dispersion liquid was prepared by adding pure water (liquid) to the hydrophilic particles as obtained in Example 1, C.I. Direct Yellow 44 as a water soluble dye, ammonium polyacrylate (anti-spreading agent), diethylene glycol (serving both as a liquid and lubricant), glycerine (serving both as a liquid and lubricant), and BT-7 (solubilizing agent), and the hydrophilic particles were uniformly dispersed in the dispersion liquid by applying a ultrasonic wave to the dispersion liquid using the ultrasonic wave dispersing instrument used in Example 1 and by stirring the dispersion liquid using a homogenizer. The proportions of the hydrophilic particles, water soluble dye, ammonium polyacrylate, diethyleneglycol, glycerine, and BT-7 in the dispersion liquid were 1% by weight, 0.1% by weight, 2.0% by weight, 7.5% by weight, 2.5% by weight, and 1% by weight, respectively.

Then, the dispersion liquid was filtered by the same method as that of Example 1 so as to prepare yellow ink (4) as the recording liquid in accordance with the present Example. Yellow ink (4) had a desirable color fidelity without coloration as compared with yellow ink (1). The yellow ink (4) was also evaluated for dryness comparatively with respect to yellow ink (1) by the same method as that of Example 2, which revealed that the drying time was almost the same as that of yellow ink (1).

The measurements of various properties (A) to (E) as noted above were conducted with respect to yellow ink (4). The results are shown in Table 1.

The yellow ink (4), as a water soluble ink of a writing tool, was charged into a ball point pen or marking pen so as to perform the time stability test and water resistance test A by the same methods as that of Example 1. The results are shown in Table 2.

Comparative Example 3

A solution was prepared by adding pure water into C.J. Direct Yellow 44 as a water soluble dye, ammonium polyacrylate, diethyleneglycol, glycerine, and BT-7, and the water soluble dye was uniformly dissolved in the solution by applying a ultrasonic wave to the solution using the ultrasonic wave dispersing instrument used in Example 1 and by stirring the solution using a homogenizer. The proportions of the water soluble dye, ammonium polyacrylate, diethyleneglycol, glycerine, and BT-7 in the solution were 1% by weight, 0.05% by weight, 7.5% by weight, 2.5% by weight, and 1% by weight.

Then, the solution was filtered by the same method as that of Example 1 so as to prepare comparative yellow ink (c). The measurements of various properties (A) to (E) as noted above were also conducted with respect to the comparative yellow ink (c). The results are shown in Table 1.

The yellow ink (c), as a water soluble ink of a writing tool, was charged into a ball point pen or marking pen so as to perform the time stability test and water resistant test A by the same methods as that of Example 1. The results are shown in Table 2.

EXAMPLE 5

A dispersion liquid was prepared using a mixture of the hydrophilic particles having a particle size of 80 nm as obtained in Example 1 as hydrophilic particles and the hydrophilic particles having a particle size of 180 nm which are rendered hydrophilic by the same process as that of Example 1, and by adding pure water (liquid) into ammonium polyacrylate (anti-spreading agent), diethyleneglycol (serving both as a liquid and lubricant), glycerine (serving both as a liquid and lubricant), and BT-7. Then, by stirring the dispersion liquid, the hydrophilic particles were uniformly dispersed in the dispersion liquid. The proportions of the hydrophilic particles with a particle size of 80 nm, hydrophilic particles with a particles size of 180 nm, ammonium polyacrylate, diethyleneglycol, glycerine, and BT-7 in the dispersion liquid were 0.8% by weight, 0.2% by weight, 1% by weight, 7.5% by weight, 2.5% by weight, and 1% by weight. Then, the dispersion liquid was filtered by the same method as that of Example 1 so as to prepare yellow ink (5) as the recording liquid in accordance with the present Example. Yellow ink (5) had a desirable color fidelity without coloration as compared with yellow ink (1). The yellow ink (5) was also evaluated for dryness comparatively with respect to yellow ink (1) by the same methods as that of Example 2, which revealed that the drying time of yellow ink (5) was almost the same as that of yellow ink (1).

The measurements of various properties (A) to (E) as noted above were conducted with respect to yellow ink (5). The results are shown in Table 1.

The yellow ink (5), as a water soluble ink of a writing tool, was charged into a ball point pen or marking pen so as to perform the time stability test and water resistance test A by the same methods as that of Example 1. The results are shown in Table 2.

Comparative Example 4

Comparative yellow ink (d) was prepared by the same method as that of Example 5 except for the yellow pigment Fast Yellow F5G, which was used instead of the hydrophilic particles. The measurements of various properties (A) to (E) as noted above were conducted with respect to yellow ink (d). The results are shown in Table 1.

The yellow ink (d), as a water soluble ink of a writing tool, was charged into a ball point pen or marking pen so as to conduct the time stability test and water resistant test A by the same methods as that of Example 1. The results are shown in Table 2.

Table 1 shows the results of measurements of various properties (A) to (E) of the yellow inks of Examples 1 to 5 and Comparative Examples 1 to 4.

TABLE 1

| | Preservation Stability | | Spray | Water | Spread- | Color Fidelity/ Color |
|---|---|---|---|---|---|---|
| | 0° C. | 60° C. | Stability | Resistance | ing | Tone |
| Example 1 | No Deposit | No Deposit | 60 Days | ○ | 2 | — |
| Example 2 | No Deposit | No Deposit | 90 Days | ○ | 3 | ○ |
| Comparative Example 1 | Deposit in 14 Days | Deposit in 14 Days | 7 Days | ○ | 3 | X |
| Example 3 | No Deposit | No Deposit | 90 Days | ○ | 3 | ○ |
| Comparative Example 2 | Deposit in 30 Days | Deposit in 14 Days | 7 Days | ○ | 3 | X |
| Example 4 | No Deposit | No Deposit | 90 Days | ○ | 2 | ◎ |
| Comparative Example 3 | No Deposit | No Deposit | 90 Days | X | 1 | ◎ |
| Example 5 | No Deposit | No Deposit | 90 Days | ○ | 4 | ○ |
| Comparative Example 4 | Deposit in 30 Days | Deposit in 14 Days | 7 Days | ○ | 4 | ○ |

It can be seen from the results of Examples 1 to 5 and Comparative Examples 1 to 4 that the recording liquid [yellow inks (1) to (5)] did not undergo any change in deterioration of color fidelity and color tone, and have superior properties of preservation stability, spray stability, and water resistance as compared with the recording liquid

[yellow inks (a), (b), and (d)] adopting the conventional yellow pigment.

It can also be seen from the results of Examples 2 and 3 that by containing an anti-spreading agent such as ammonium polyacrylate and a co-polymer of vinylalcohol and acrylic acid in the recording liquid of the present invention, recording can be carried out with less spreading without reducing the dryness of the recording liquid. Further, it can be seen from the result of Example 4 that by using a water soluble dye in conjunction with the hydrophilic particles, the color fidelity and color tone of the recording liquid can be improved, and it can also be seen from the result of Example 5 that by using two types of pigments having a different size, recording can be carried out with even less spreading.

As in Comparative Example 3, when only the water soluble dye is used as a coloring agent, due to the fact that the water soluble dye dissolves in the liquid, while a superior preservation stability and superior spray stability can be obtained, water resistance is poor and severe spreading occurs. In contrast, it can be seen that the recording liquid of the present invention has a preservation stability and spray stability which are as good as that of the recording liquid [yellow ink (c)] which employs only the water soluble dye, thus obtaining a recording liquid with superior water resistance and suppressed spreading.

Table 2 shows the results of time stability test and water resistance test A with respect to the yellow inks of Examples 1 to 5 and Comparative Examples 1 to 4.

TABLE 2

| | Time Stability | | |
|---|---|---|---|
| | 15 Days | 30 Days | Water Resistance A |
| Example 1 | ○ | ○ | ○ |
| Example 2 | ○ | ○ | ○ |
| Comparative Example 1 | x | x | ○ |
| Example 3 | ○ | ○ | ○ |
| Comparative Example 2 | ○ | ○ | ○ |
| Example 4 | ○ | ○ | ○ |
| Comparative Example 3 | ○ | ○ | x |
| Example 5 | ○ | ○ | ○ |
| Comparative Example 4 | ○ | x | ○ |

As is clear from the results of Examples 1 to 5 and Comparative Examples 1 to 4, the recording liquid in accordance with the present invention exhibits a superior time stability and water resistance even when used as a recording liquid of a writing tool such as a ball point pen and marking pen.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A yellow recording liquid containing yellow pigment particles which are dispersed in a liquid, the yellow pigment particles being rendered hydrophilic at least on their surface, wherein the yellow pigment particles comprise at least two yellow pigment particles having substantially different particle sizes which different particle sizes are observable as two or more peaks.

2. The yellow recording liquid as set forth in claim 1, wherein to the yellow pigment particles is introduced a hydrophilic group.

3. The yellow recording liquid as set forth in claim 2, wherein the hydrophilic group is a sulfonic acid group.

4. The yellow recording liquid as set forth in claim 1, wherein the yellow pigment particles are made up of an yellow pigment having an azo structure.

5. The yellow recording liquid as set forth in claim 4, wherein the yellow pigment particles are made up of an yellow pigment having a mono-azo structure.

6. The yellow recording liquid as set forth in claim 5, wherein a coupler component making up the yellow pigment does not include a condensed ring.

7. The yellow recording liquid as set forth in claim 1, wherein the yellow pigment particles comprise a mixture of hydrophobic particles having particle size "a" and hydrophobic particles having particle size "b", wherein a ratio of particle size "a" to particle size "b" is in a range of more than 1:1 and not more than 1:10.

8. The yellow recording liquid as set forth in claim 1, wherein a particle size of the yellow pigment particles is in a range of not less than 10 nm and not more than 5 μm.

9. The yellow recording liquid as set forth in claim 1, wherein a content of the yellow pigment particles is in a range of not less than 0.01 percent by weight to not more than 20 percent by weight.

10. The yellow recording liquid as set forth in claim 1, wherein said yellow recording liquid includes water as a main component liquid.

11. The yellow recording liquid as set forth in claim 1, wherein said yellow recording liquid includes a lubricant.

12. The yellow recording liquid as set forth in claim 1, wherein said yellow recording liquid includes at least one kind of alkylene glycol.

13. The yellow recording liquid as set forth in claim 1, wherein said yellow recording liquid includes an anti-spreading agent.

14. The yellow recording liquid as set forth in claim 13, wherein the anti-spreading agent is a co-polymer of vinyl alcohol and acrylic acid, or ammonium polyacrylate.

15. The yellow recording liquid as set forth in claim 14, wherein said yellow recording liquid includes the co-polymer of vinyl alcohol and acrylic acid in a range of not less than 1.0 percent by weight and not more than 10 percent by weight.

16. The yellow recording liquid as set forth in claim 14, wherein said yellow recording liquid includes the ammonium polyacrylate in a range of not less than 0.5 percent by weight and not more than 10 percent by weight.

17. The yellow recording liquid as set forth in claim 1, wherein said yellow recording liquid includes a water soluble dye.

18. A method of using a yellow recording liquid which contains yellow pigment particles being dispersed in a liquid, the yellow pibment particles being rendered hydrophilic at least on their surface, wherein the yellow recording liquid is used as a recording liquid of an ink jet recording device or a recording liquid of a writing tool, and wherein the yellow pigment particles comprise at least two yellow pigment particles having substantially different particle sizes which different particle sizes are observable as two or more peaks.

19. A method for producing an yellow recording liquid, comprising the steps of:

preparing a solution in which an yellow pigment is dissolved in an acidic liquid;

turning the solution into particles;

bringing the particles into contact with vapor containing water vapor and creating a supersaturated atmosphere of the vapor;

depositing yellow pigment particles which are rendered hydrophilic at least on their surface by allowing water to condense on the surface of the particles; and dispersing the yellow pigment particles deposited in a liquid.

20. The method as set forth in claim 19, wherein the yellow pigment particles deposited are dispersed in the liquid using a ultrasonic wave or homogenizer.

21. The method as set forth in claim 19, wherein in the dispersion step, the deposited yellow pigment particles comprise a mixture of hydrophobic particles having particle size "a" and hydrophobic particles having particle size "b", wherein particle size "a" is substantially distinguishable from particle size "b" such that different particle sizes "a" and "b" are observable as two peaks, and are dispersed in the liquid.

22. The yellow recording liquid as set forth in claim 1, wherein the yellow pigment particles comprise a mixture of hydrophobic particles having particle size "a" and hydrophobic particles having particle size "b", and wherein particle size "a" is at least twice as large as particle size "b".

23. The yellow recording liquid as set forth in claim 1, wherein the yellow pigment particles comprise a mixture of hydrophobic particles having particle size "a" and hydrophobic particles having particle size "b", and wherein particle size "a" is about 180 nm and particle size "b" is about 80 nm.

24. A yellow recording liquid containing yellow pigment particles which are dispersed in liquid, the yellow pigment particles being rendered hydrophilic at least on their surface, wherein the yellow pigment particles consist essentially of a mixture of hydrophobic particles having particle size "a" and hydrophobic particles having particle size "b", wherein the ratio of particle size "a" to particle size "b" is between about 1:2 and about 1:10.

25. A yellow recording liquid as set forth in claim 1, wherein each of the at least two yellow pigment particles having substantially different particle sizes are composed of the same yellow pigment.

26. A yellow recording liquid as set forth in claim 1, wherein at least two yellow pigment particles having substantially different particle sizes are composed of different yellow pigments.

* * * * *